US012656544B2

(12) United States Patent
Yu et al.

(10) Patent No.: US 12,656,544 B2
(45) Date of Patent: Jun. 16, 2026

(54) PHOTONIC SEMICONDUCTOR DEVICE AND METHOD OF MANUFACTURE

(71) Applicant: Taiwan Semiconductor Manufacturing Co., Ltd., Hsinchu (TW)

(72) Inventors: Chen-Hua Yu, Hsinchu (TW); Tsung-Fu Tsai, Changhua City (TW); Chih-Hao Yu, Tainan (TW); Jui Lin Chao, New Taipei City (TW); Szu-Wei Lu, Hsinchu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 300 days.

(21) Appl. No.: 18/324,576

(22) Filed: May 26, 2023

(65) Prior Publication Data

US 2024/0272352 A1     Aug. 15, 2024

Related U.S. Application Data

(60) Provisional application No. 63/485,041, filed on Feb. 15, 2023.

(51) Int. Cl.
 *G02B 6/12* (2006.01)
 *G02B 6/136* (2006.01)
 *G02B 6/26* (2006.01)

(52) U.S. Cl.
 CPC ......... *G02B 6/12004* (2013.01); *G02B 6/136* (2013.01); *G02B 6/26* (2013.01); *G02B 2006/12121* (2013.01)

(58) Field of Classification Search
 CPC .............................. G02B 6/12004; G02B 6/26
 See application file for complete search history.

(56) References Cited

U.S. PATENT DOCUMENTS

| | | | |
|---|---|---|---|
| 10,209,452 B1 | 2/2019 | Hung et al. | |
| 10,295,749 B1 * | 5/2019 | Janta-Polczynski | ..... G02B 6/30 |
| 10,324,260 B1 * | 6/2019 | Evans | ........................ C09J 9/00 |
| 10,551,566 B2 * | 2/2020 | Amb | ........................ G02B 1/04 |
| 10,598,875 B2 | 3/2020 | Xie | |

(Continued)

FOREIGN PATENT DOCUMENTS

| | | |
|---|---|---|
| CN | 110261966 A | 9/2019 |
| CN | 114217387 A | 3/2022 |

(Continued)

*Primary Examiner* — Michael Stahl
(74) *Attorney, Agent, or Firm* — Slater Matsil, LLP

(57) ABSTRACT

A method includes connecting a first photonic package to a substrate, wherein the first photonic package includes a first waveguide and a first support over the first waveguide; connecting a second photonic package to the substrate adjacent the first photonic package, wherein the second photonic package includes a second waveguide, wherein the first photonic package and the second photonic package are laterally separated by a gap that has a width in the range of 15 μm to 190 μm; depositing a first quantity of an optical adhesive into the gap; and curing the first quantity of the optical adhesive, wherein after curing the first quantity of the optical adhesive, the first waveguide is optically coupled to the second waveguide through the first quantity of the optical adhesive.

20 Claims, 28 Drawing Sheets

(56) References Cited

U.S. PATENT DOCUMENTS

| | | | |
|---|---|---|---|
| 2010/0044723 A1 | 2/2010 | Yamamoto | |
| 2013/0223788 A1* | 8/2013 | Koos | G02B 6/30 |
| | | | 385/14 |
| 2017/0254968 A1 | 9/2017 | Ding et al. | |
| 2020/0091124 A1* | 3/2020 | Liao | G02B 6/4201 |
| 2020/0395347 A1 | 12/2020 | Yu et al. | |
| 2021/0066269 A1 | 3/2021 | Yang et al. | |
| 2021/0088723 A1 | 3/2021 | Yu et al. | |
| 2021/0223489 A1 | 7/2021 | Weng et al. | |
| 2021/0247569 A1* | 8/2021 | Traverso | G02B 6/4212 |
| 2021/0249835 A1 | 8/2021 | Cheng et al. | |
| 2021/0405315 A1* | 12/2021 | Guerber | H01S 5/0225 |
| 2022/0043208 A1 | 2/2022 | Hsia et al. | |
| 2022/0099887 A1 | 3/2022 | Yu et al. | |
| 2023/0072926 A1* | 3/2023 | Morrison | G02B 6/4202 |
| 2023/0245967 A1* | 8/2023 | Weng | G02B 6/428 |
| | | | 257/98 |
| 2023/0377907 A1* | 11/2023 | Wu | H01L 25/105 |
| 2024/0369783 A1* | 11/2024 | Yu | G02B 6/4283 |
| 2025/0151447 A1* | 5/2025 | Punzalan | H10F 39/8063 |

FOREIGN PATENT DOCUMENTS

| | | | |
|---|---|---|---|
| JP | 2010049170 A | 3/2010 | |
| KR | 20210076112 A | 6/2021 | |
| KR | 20210095549 A | 8/2021 | |
| KR | 20210154086 A | 12/2021 | |
| TW | 202046474 A | 12/2020 | |
| TW | 202109808 A | 3/2021 | |
| TW | 202113409 A | 4/2021 | |
| TW | 202212879 A | 4/2022 | |
| TW | 202213710 A | 4/2022 | |
| WO | WO 2022/2646321 A1 * | 12/2022 | |
| WO | WO 2025/162935 A1 * | 8/2025 | |

* cited by examiner

100

102B

102C

107

104

106

100

PHOTONIC SEMICONDUCTOR DEVICE AND METHOD OF MANUFACTURE

PRIORITY CLAIM AND CROSS-REFERENCE

This application claims the benefits of U.S. Provisional Application No. 63/485,041, filed on Feb. 15, 2023, which application is hereby incorporated herein by reference in its entirety.

BACKGROUND

Electrical signaling and processing are one technique for signal transmission and processing. Optical signaling and processing have been used in increasingly more applications in recent years, particularly due to the use of optical fiber-related applications for signal transmission.

Optical signaling and processing are typically combined with electrical signaling and processing to provide full-fledged applications. For example, optical fibers may be used for long-range signal transmission, and electrical signals may be used for short-range signal transmission as well as processing and controlling. Accordingly, devices integrating optical components and electrical components are formed for the conversion between optical signals and electrical signals, as well as the processing of optical signals and electrical signals. Packages thus may include both optical (photonic) dies including optical devices and electronic dies including electronic devices.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
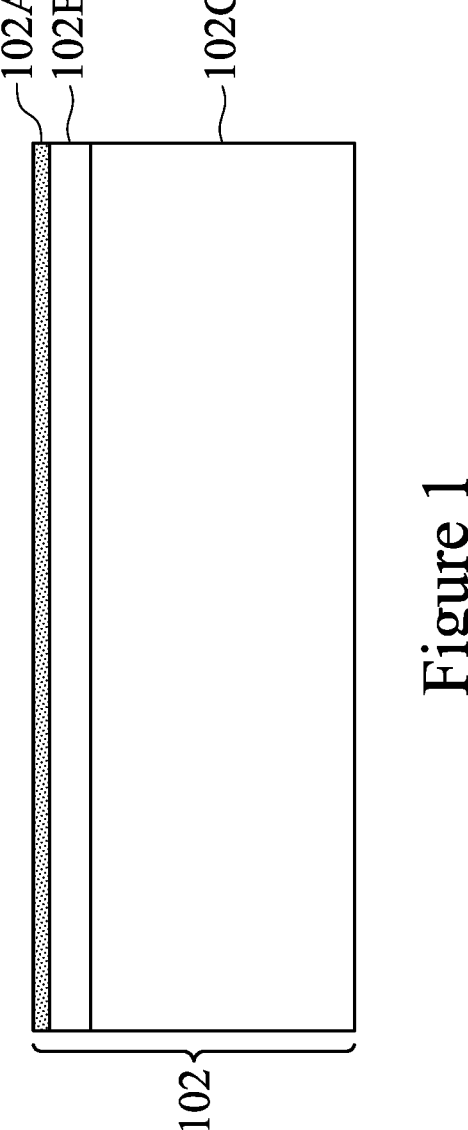
FIGS. 1 through 16 illustrate cross-sectional views of intermediate steps of forming a photonic package, in accordance with some embodiments.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In this disclosure, various aspects of a photonic system and the formation thereof are described. A photonic system comprising photonic packages including both optical devices and electrical devices, and the method of forming the same are provided, in accordance with some embodiments. In particular, a photonic package in a photonic system may be configured to transmit optical signals and/or optical power to an adjacent photonic package of the photonic system. For example, each photonic package may comprise waveguides with edge couplers, with the edge couplers of the adjacent photonic packages being optically coupled across the gap between the adjacent photonic packages. In some embodiments, a top recess is formed in one or more of the adjacent photonic packages. Depositing the optical glue into the recess allows the optical glue to flow into the gap between the photonic packages. In some embodiments, a stack is formed from multiple layers of optical glue. Techniques described herein include the deposition of an optical glue in the gap between the adjacent photonic packages without depositing the optical glue on undesired surfaces, such as on top surfaces of the photonic packages or on conductive connectors. The techniques described herein can allow for the gap between adjacent photonic packages to be reduced, which can improve the optical coupling between the photonic packages and thus improve the operation of the photonic system. Some variations of some embodiments are discussed. Throughout the various views and illustrative embodiments, like reference numbers are used to designate like elements.

FIGS. 1 through 18B show cross-sectional views of intermediate steps of forming a photonic package 100 (see FIGS. 18A-18B), in accordance with some embodiments. In some embodiments, the photonic package 100 may act as an input/output (I/O) interface between optical signals and electrical signals in a photonic system. For example, one or more photonic packages may be used in a photonic system such as the photonic system 300 (see FIG. 19), the like, or another photonic system. In some embodiments, multiple photonic packages 100 are formed on the same substrate (e.g., substrate 102 of FIG. 1) and then subsequently singulated into individual photonic packages 100.

Turning first to FIG. 1, a buried oxide ("BOX") substrate 102 is provided, in accordance with some embodiments. The BOX substrate 102 includes an oxide layer 102B formed over a substrate 102C, and a silicon layer 102A formed over the oxide layer 102B. The substrate 102C may be, for example, a material such as a glass, ceramic, dielectric, a semiconductor, the like, or a combination thereof. In some embodiments, the substrate 102C may be a semiconductor substrate, such as a bulk semiconductor or the like, which may be doped (e.g., with a p-type or an n-type dopant) or undoped. The substrate 102C may be a wafer, such as a silicon wafer (e.g., a 12-inch silicon wafer). Other substrates, such as a multi-layered or gradient substrate may also be used. In some embodiments, the semiconductor material of the substrate 102C may include silicon; germanium; a compound semiconductor including silicon carbide, gallium arsenic, gallium phosphide, indium phosphide, indium arsenide, and/or indium antimonide; an alloy semiconductor including silicon germanium, GaAsP, AlInAs, AlGaAs, GaInAs, GaInP, and/or GaInAsP; or combinations thereof. The oxide layer 102B may be, for example, a silicon oxide or the like. In some embodiments, the oxide layer 102B may have a thickness between about 0.5 μm and about 4 μm. The silicon layer 102A may have a thickness between about 0.1 μm and about 1.5 μm, in some embodiments. Other thicknesses or materials are possible. The BOX substrate 102 may be referred to as having a front side or front surface (e.g., the side facing upwards in FIG. 1), and a back side or back surface (e.g., the side facing downwards in FIG. 1).

Figure 2:
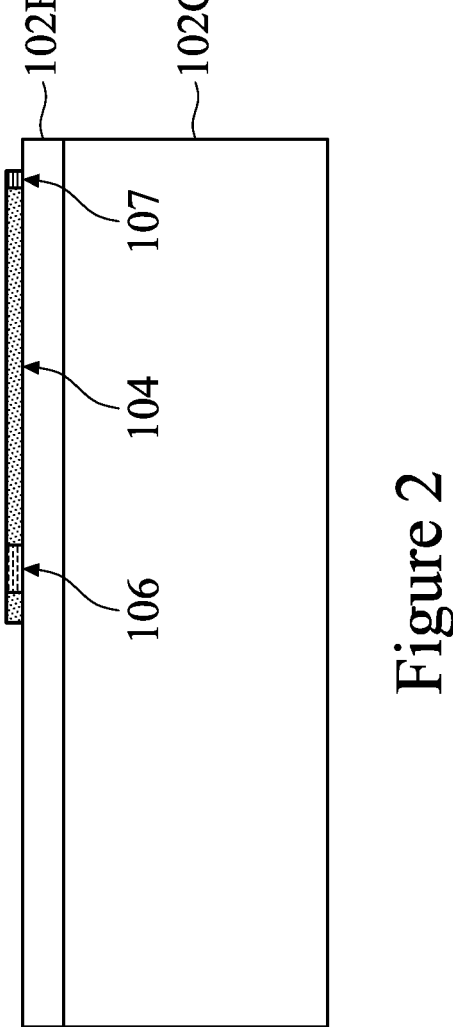

In FIG. 2, the silicon layer 102A is patterned to form silicon regions for waveguides 104, photonic components 106, and/or couplers 107, in accordance with some embodiments. The silicon layer 102A may be patterned using suitable photolithography and etching techniques. For example, a hardmask layer (e.g., a nitride layer or other dielectric material, not shown in FIG. 2) may be formed over the silicon layer 102A and patterned, in some embodiments. The pattern of the hardmask layer may then be transferred to the silicon layer 102A using one or more etching techniques, such as dry etching and/or wet etching techniques. For example, the silicon layer 102A may be etched to form recesses defining the waveguides 104, with sidewalls of the remaining unrecessed portions defining sidewalls of the waveguides 104. In some embodiments, more than one photolithography and etching sequence may be used in order to pattern the silicon layer 102A. One waveguide 104 or multiple waveguides 104 may be patterned from the silicon layer 102A. If multiple waveguides 104 are formed, the multiple waveguides 104 may be individual separate waveguides 104 or connected as a single continuous structure. In some embodiments, one or more of the waveguides 104 form a continuous loop. Other configurations or arrangements of waveguides 104, the photonic components 106, or the couplers 107 are possible. In some cases, the waveguides 104, the photonic components 106, and the couplers 107 may be collectively referred to as "the photonic layer."

The photonic components 106 may be integrated with the waveguides 104, and may be formed with the silicon waveguides 104 in some embodiments. The photonic components 106 may be physically and/or optically coupled to the waveguides 104 to interact with optical signals within the waveguides 104. The photonic components 106 may include, for example, photodetectors and/or modulators. For example, a photodetector may be optically coupled to the waveguides 104 to detect optical signals within the waveguides 104 and generate electrical signals corresponding to the optical signals. A modulator may be optically coupled to the waveguides 104 to receive electrical signals and generate corresponding optical signals within the waveguides 104 by modulating optical power within the waveguides 104. In this manner, the photonic components 106 facilitate the input/output (I/O) of optical signals to and from the waveguides 104. In other embodiments, the photonic components may include other active or passive components, such as laser diodes, optical signal splitters, or other types of photonic structures or devices. Optical power may be provided to the waveguides 104 by, for example, an optical fiber (not shown) coupled to an external light source or a photonic component within the photonic package 100 such as a laser diode (not shown in the figures). In some embodiments, optical power and/or optical signals may be transmitted to the waveguides 104 from an adjacent photonic package (e.g. photonic package 200 of FIG. 19). For example, the adjacent photonic package may comprise a waveguide or a laser diode that is optically coupled to the waveguides 104 by an edge coupler (e.g., coupler 107).

In some embodiments, the photodetectors may be formed by, for example, partially etching regions of the waveguides 104 and growing an epitaxial material on the remaining silicon of the etched regions. The waveguides 104 may be etched using acceptable photolithography and etching techniques. The epitaxial material may comprise, for example, a semiconductor material such as germanium (Ge), which may be doped or undoped. In some embodiments, an implantation process may be performed to introduce dopants within the silicon of the etched regions as part of the formation of the photodetectors. The silicon of the etched regions may be doped with p-type dopants, n-type dopants, or a combination. In some embodiments, the modulators may be formed by, for example, partially etching regions of the waveguides 104 and then implanting appropriate dopants within the remaining silicon of the etched regions. The waveguides 104 may be etched using acceptable photolithography and etching techniques. In some embodiments, the etched regions used for the photodetectors and the etched regions used for the modulators may be formed using one or more of the same photolithography or etching steps. The silicon of the etched regions may be doped with p-type dopants, n-type dopants, or a combination. In some embodiments, the etched regions used for the photodetectors and the etched regions used for the modulators may be implanted using one or more of the same implantation steps. Other photonic components 106 and other manufacturing steps are possible.

In some embodiments, one or more couplers 107 may be integrated with the waveguides 104, and may be formed with the waveguides 104. The couplers 107 may be continuous with the waveguides 104 and may be formed in the same processing steps as the waveguides 104 or other photonic components 106. The couplers 107 are photonic structures that allow optical signals and/or optical power to be transferred between the waveguides 104 and an optical component such as an optical fiber or a waveguide of another photonic system. The couplers 107 may include one or more edge couplers, such as the edge coupler as shown in FIG. 2. Accordingly a coupler 107 may also be referred to herein as an edge coupler 107 when appropriate. An edge coupler 107 allows optical signals and/or optical power to be transferred between the waveguide 104 and an optical or photonic component that is "edge-mounted" near a sidewall of the photonic package 100, such as another waveguide, another photonic package, an optical fiber, an external laser diode, or the like. In some embodiments, the couplers 107 include grating couplers, which allow optical signals and/or optical power to be transferred between a waveguide 104 and an optical or photonic component above or below the waveguide 104, such as an optical fiber, a photodetector, another waveguide, or the like.

A photonic package 100 may include a single coupler 107, multiple couplers 107, or multiple types of couplers 107, in some embodiments. The couplers 107 may be formed using acceptable photolithography and etching techniques. In some embodiments, the couplers 107 are formed using the same photolithography or etching steps as the waveguides 104 and/or the photonic components 106. In other embodiments, the couplers 107 are formed after the waveguides 104 and/or the photonic components 106 are formed.

Figure 3:
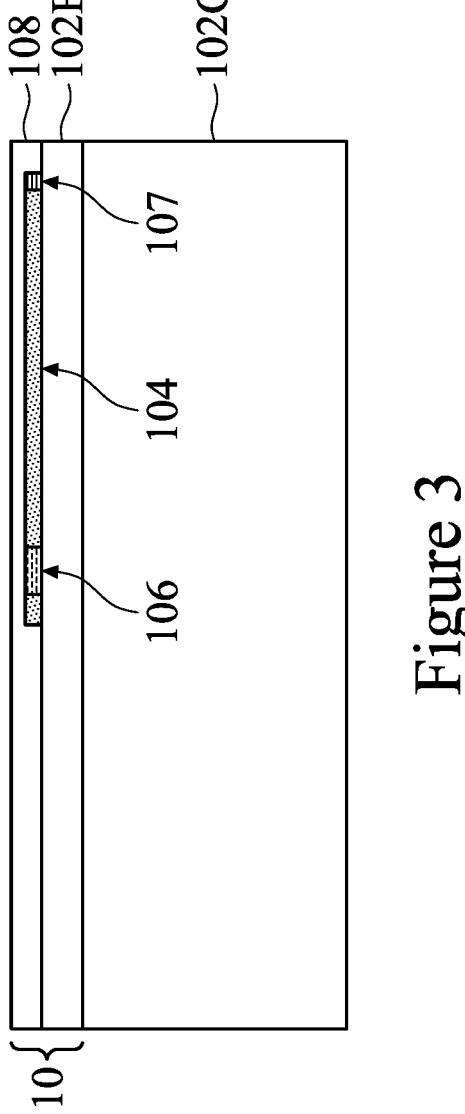

In FIG. 3, a dielectric layer 108 is formed on the front side of the BOX substrate 102 to form a photonic routing structure 110, in accordance with some embodiments. The dielectric layer 108 is formed over the waveguides 104, the photonic components 106, the couplers 107, and the oxide layer 102B. The dielectric layer 108 may be formed of one or more layers of silicon oxide, silicon nitride, a combination thereof, or the like, and may be formed by CVD, PVD, atomic layer deposition (ALD), a spin-on-dielectric process, the like, or a combination thereof. In some embodiments, the dielectric layer 108 may be formed by a high density plasma chemical vapor deposition (HDP-CVD), a flowable CVD (FCVD) (e.g., a CVD-based material deposition in a remote plasma system and post curing to make it convert to another material, such as an oxide), the like, or a combination thereof. Other dielectric materials formed by any acceptable process may be used. In some embodiments, the dielectric layer 108 is then planarized using a planarization process such as a CMP process, a grinding process, or the like. The dielectric layer 108 may be formed having a thickness over the oxide layer 102B between about 50 nm and about 500 nm, or may be formed having a thickness over the waveguides 104 between about 10 nm and about 200 nm, in some embodiments. Other thicknesses are possible.

Due to the difference in refractive indices of the materials of the waveguides 104 and dielectric layer 108, the waveguides 104 have high internal reflection such that light is substantially confined within the waveguides 104, depending on the wavelength of the light and the refractive indices of the respective materials. In an embodiment, the refractive index of the material of the waveguides 104 is higher than the refractive index of the material of the dielectric layer 108. For example, the waveguides 104 may comprise silicon, and the dielectric layer 108 may comprise silicon oxide and/or silicon nitride. Other materials are possible.

Figure 4:
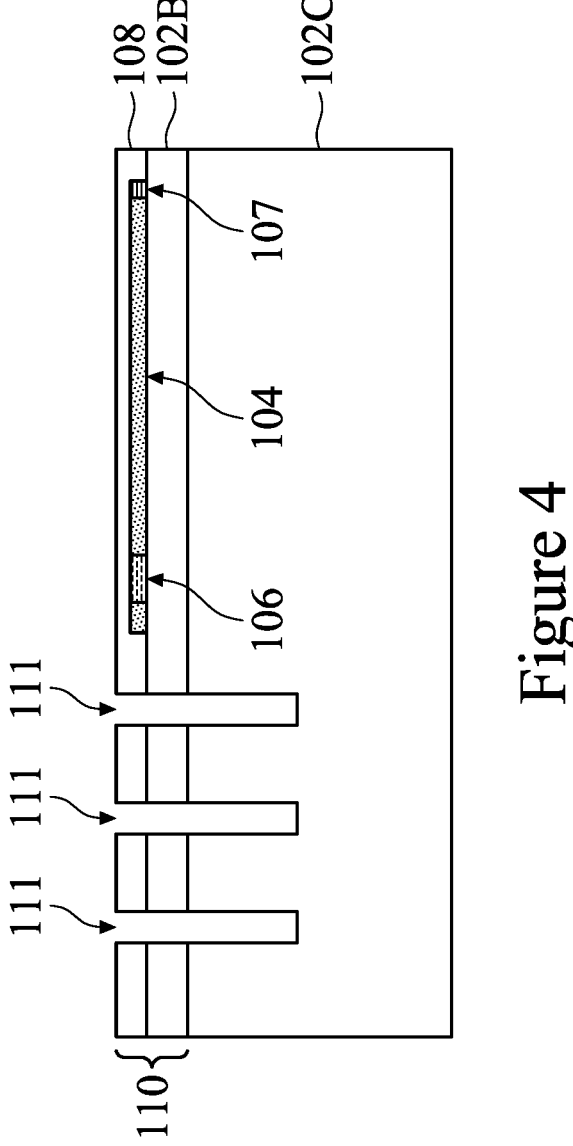

In FIG. 4, openings 111 are formed extending into the substrate 102C, in accordance with some embodiments. The openings 111 are formed extending through the dielectric layer 108 and the oxide layer 102B, and may extend partially into the substrate 102C. The openings 111 may be formed by acceptable photolithography and etching techniques, such as by forming and patterning a photoresist and then performing an etching process using the patterned photoresist as an etching mask. The etching process may include, for example, a dry etching process and/or a wet etching process.

Figure 5:
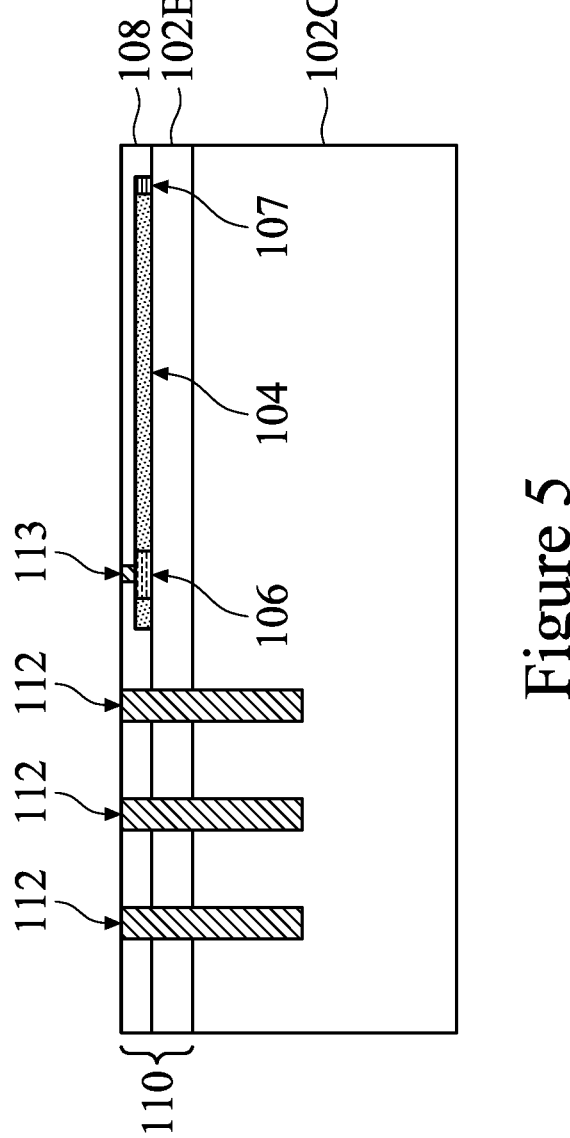

In FIG. 5, a conductive material is formed in the openings 111, thereby forming vias 112, in accordance with some embodiments. In some embodiments, a liner (not shown), such as a diffusion barrier layer, an adhesion layer, or the like, may be formed in the openings 111 from tantalum nitride, tantalum (Ta), titanium nitride, titanium (Ti), cobalt tungsten, or the like, and may be formed using a suitable deposition process such as ALD or the like. In some embodiments, a seed layer (not shown), which may include copper or a copper alloy may then be deposited in the openings 111. The conductive material of the vias 112 is formed in the openings 111 using, for example, ECP or electro-less plating. The conductive material may include, for example, a metal or a metal alloy such as copper, silver, gold, tungsten, cobalt, aluminum, or alloys thereof. A planarization process (e.g., a CMP process or a grinding process) may be performed to remove excess conductive material along the top surface of the dielectric layer 108, such that top surfaces of the vias 112 and the dielectric layer 108 are level. The vias 112 may be formed using any suitable process, such as by a damascene process (e.g., single damascene or dual damascene), the like, or another process. More or fewer vias 112 may be formed, and in some other embodiments no vias 112 are formed.

FIG. 5 also shows the formation of contacts 113 that extend through the dielectric layer 108 and are electrically connected to the photonic components 106. The contacts 113 allow electrical power or electrical signals to be transmitted to the photonic components 106 and electrical signals to be transmitted from the photonic components 106. In this manner, the photonic components 106 may convert electrical signals (e.g., from an electronic die 122, see FIG. 8) into optical signals transmitted by the waveguides 104, and/or convert optical signals from the waveguides 104 into electrical signals (e.g., that may be received by an electronic die 122). The contacts 113 may be formed before or after formation of the vias 112, and the formation of the contacts 113 and the formation of the vias 112 may share some steps such as deposition of the conductive material and/or planarization. In some embodiments, the contacts 113 may be formed by a damascene process, e.g., single damascene, dual damascene, or the like. For example, in some embodiments, openings (not shown) for the contacts 113 are first formed in the dielectric layer 108 using acceptable photolithography and etching techniques. A conductive material may then be formed in the openings, forming the contacts 113. Excess conductive material may be removed using a CMP process or the like. The conductive material of the contacts 113 may be formed of a metal or a metal alloy including aluminum, copper, tungsten, or the like, which may be the same as that of the vias 112. The contacts 113 may be formed using other techniques or materials in other embodiments. More or fewer contacts 113 may be formed in other embodiments.

Figure 6:
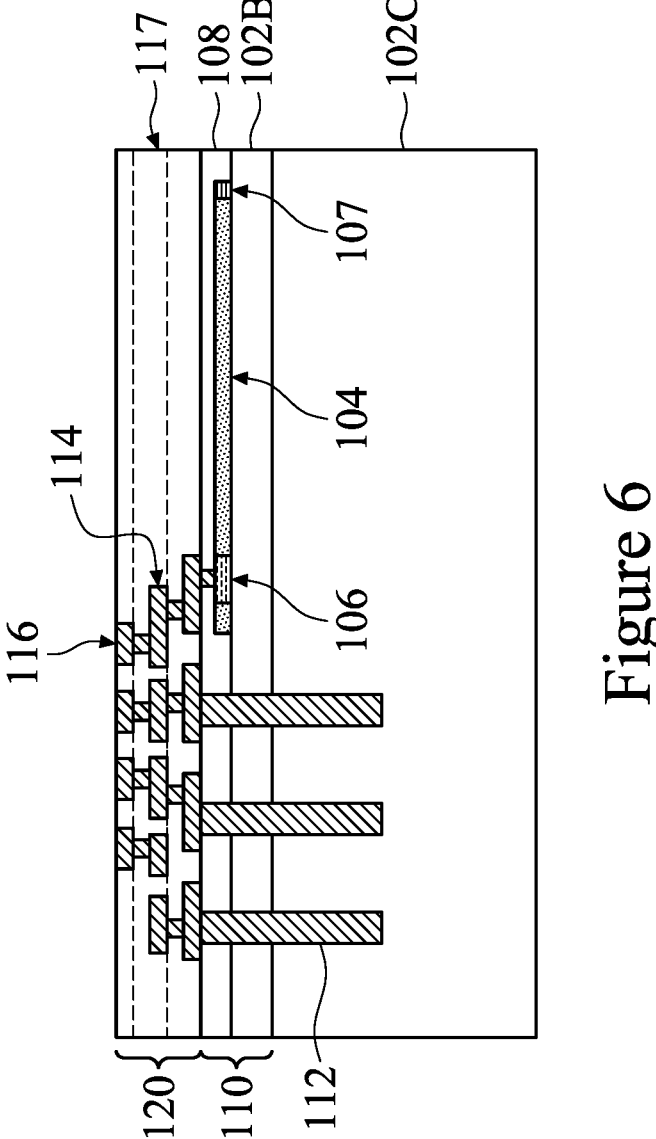

In FIG. 6, a redistribution structure 120 is formed over the dielectric layer 108, in accordance with some embodiments. The redistribution structure 120 includes one or more dielectric layers 117 and conductive features 114 formed in the dielectric layer(s) 117 that provide interconnections and electrical routing. For example, the redistribution structure 120 may connect the vias 112, the contacts 113, and/or overlying devices such as electronic dies 122 (see FIG. 8). In some other embodiments, the redistribution structure 120 may electrically connect to the photonic component 106 instead of a contact 113, or the contact 113 may be considered part of the redistribution structure 120. The dielectric layers 117 may be, for example, insulating or passivating layers, and may comprise one or more materials similar to those described above for the dielectric layer 108, such as a silicon oxide or a silicon nitride, or may comprise a different material. The dielectric layers 117 and the dielectric layer 108 may be transparent or nearly transparent to light within the same range of wavelengths, in some embodiments. The dielectric layers 117 may be formed using a technique similar to those described above for the dielectric layer 108 or using a different technique. The conductive features 114 may include conductive lines and vias, and may be formed by a damascene process (e.g., single damascene, duel damascene), the like, or another process. As shown in FIG. 6, conductive pads 116 are formed in the topmost layer of the dielectric layers 117. A planarization process (e.g., a CMP process or the like) may be performed after forming the conductive pads 116 such that surfaces of the conductive pads 116 and the topmost dielectric layer 117 are substantially coplanar (e.g., level). The redistribution structure 120 may include more or fewer dielectric layers 117, conductive features 114, or conductive pads 116 than shown in FIG. 6, and may have a different arrangement or configuration. The redistribution structure 120 may be formed having a thickness between about 4 μm and about 6 μm, in some embodiments. Other thicknesses are possible.

Figure 7:
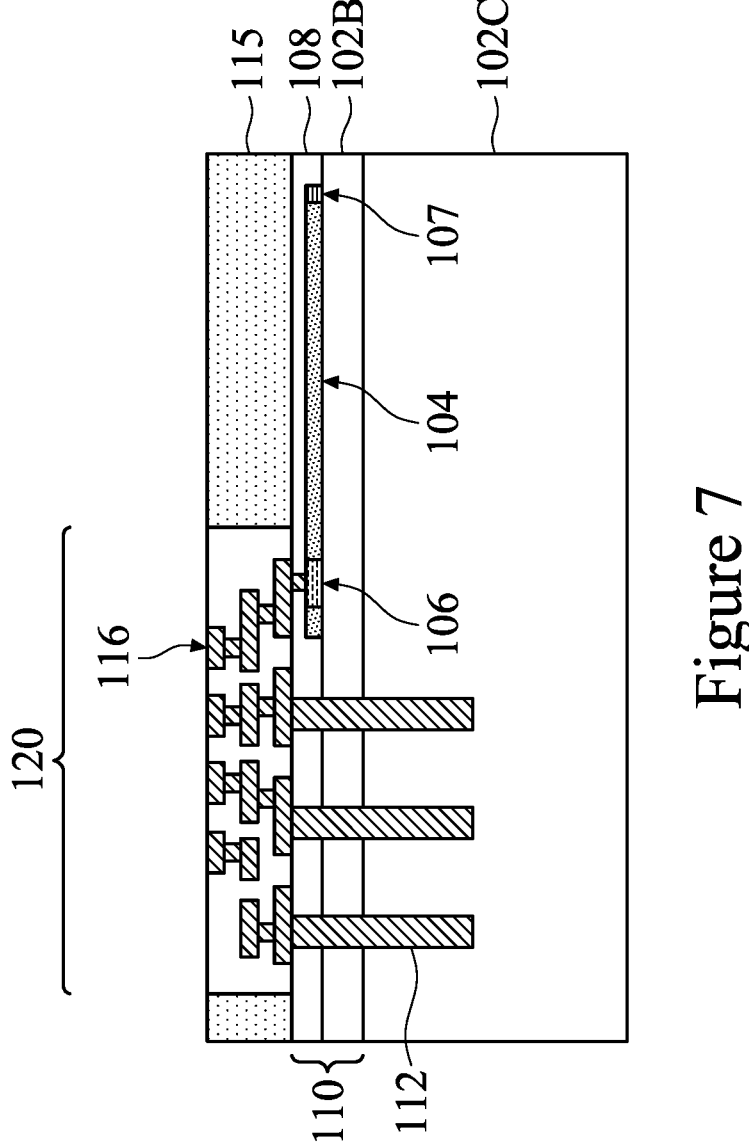

In FIG. 7, portions of the redistribution structure 120 are removed and replaced by a dielectric layer 115, in accordance with some embodiments. The portions of the redistribution structure 120 may be removed, for example, using acceptable photolithography and etching techniques, such as by forming and patterning a photoresist and then performing an etching process to remove the dielectric layers 117 using the patterned photoresist as an etching mask. The etching process may include, for example, a dry etching process and/or a wet etching process. Removing the portions of the redistribution structure 120 may expose the dielectric layer 108, in some embodiments. In other embodiments, the dielectric layer 108 may remain covered by one or more dielectric layers 117 after removing the portions of the redistribution structure 120.

After removing the portions of the redistribution structure, the dielectric layer 115 may then be deposited to replace the removed portions of the redistribution structure 120. The dielectric layer 115 may comprise one or more materials similar to those described above for the dielectric layer 108, such as a silicon oxide or a silicon nitride, or may comprise a different material. In some embodiments, the dielectric layer 115 and the dielectric layer 108 may be transparent or nearly transparent to light within the same range of wavelengths. The dielectric layer 115 may be formed using a technique similar to those described above for the dielectric layer 108 or using a different technique. In some embodiments, a planarization process (e.g., a CMP or grinding process) is used to remove excess material of the dielectric layer 115. The planarization process may also expose the conductive pads 116. After performing the planarization process, the dielectric layer 115, the topmost dielectric layer 117, and/or the conductive pads 116 may have substantially level surfaces. In some cases, replacing a portion of the redistribution structure 120 with the dielectric layer 115 can improve the optical confinement within the waveguides 104 beneath the dielectric layer 115. In other embodiments, the redistribution structure 120 is not etched and the dielectric layer 115 is not formed. In other embodiments, etching the redistribution structure 120 separates the redistribution structure 120 into multiple separated regions.

Figure 8:
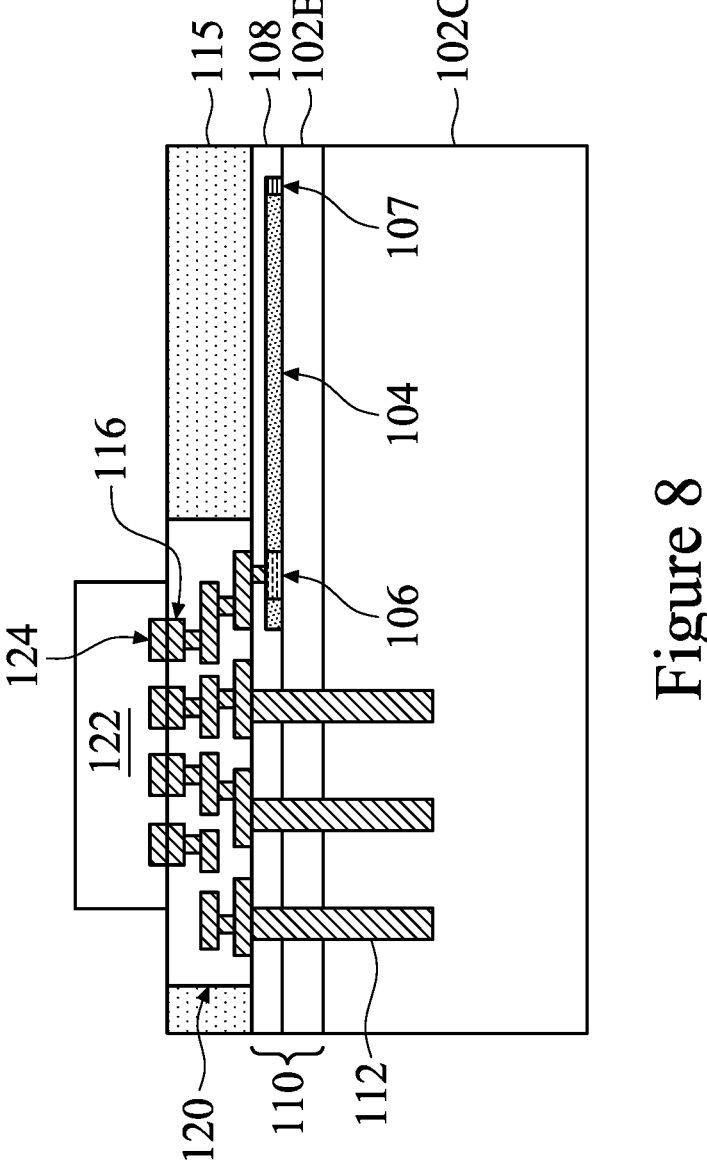

In FIG. 8, one or more electronic dies 122 are bonded to the redistribution structure 120, in accordance with some embodiments. The electronic dies 122 may be, for example, semiconductor devices, dies, or chips that communicate with the photonic components 106 using electrical signals. One electronic die 122 is shown in FIG. 8, but a photonic package 100 may include two or more electronic dies 122 in other embodiments. In some cases, multiple electronic dies 122 may be incorporated into a single photonic package 100 in order to reduce processing cost. The electronic die 122 may include die connectors 124, which may be, for example, conductive pads, conductive pillars, or the like. In some embodiments, the electronic die 122 may have a thickness between about 10 μm and about 35 μm. Other thicknesses are possible.

The electronic die 122 may include integrated circuits for interfacing with the photonic components 106, such as circuits for controlling the operation of the photonic components 106. For example, the electronic die 122 may include controllers, drivers, transimpedance amplifiers, the like, or combinations thereof. The electronic die 122 may also include a CPU. In some embodiments, the electronic die 122 includes circuits for processing electrical signals received from photonic components 106, such as for processing electrical signals received from a photonic component 106 comprising a photodetector. The electronic die 122 may control high-frequency signaling of the photonic components 106 according to electrical signals (digital or analog) received from another device or die, in some embodiments. In some embodiments, the electronic die 122 may be an electronic integrated circuit (EIC) or the like that provides Serializer/Deserializer (SerDes) functionality. In this manner, the electronic die 122 may act as part of an I/O interface between optical signals and electrical signals within a photonic package 100, and the photonic package 100 described herein could be considered a system-on-chip (SoC) device or a system-on-integrated-circuit (SoIC) device.

In some embodiments, the electronic die 122 is bonded to the redistribution structure 120 by dielectric-to-dielectric bonding and/or metal-to-metal bonding (e.g., direct bonding, fusion bonding, oxide-to-oxide bonding, hybrid bonding, or the like). In such embodiments, covalent bonds may be formed between oxide layers, such as the topmost dielectric layer 117 and surface dielectric layers (not separately indicated) of the electronic die 122. During the bonding, metal-to-metal bonding may also occur between the die connectors 124 of the electronic die 122 and the conductive pads 116 of the redistribution structure 120.

In some embodiments, before performing the dielectric-to-dielectric bonding and/or metal-to-metal bonding process, a surface treatment is performed on the electronic die 122. In some embodiments, the top surfaces of the redistribution structure 120 and/or the electronic die 122 may first be activated utilizing, for example, a dry treatment, a wet treatment, a plasma treatment, exposure to an inert gas, exposure to $H_2$, exposure to $N_2$, exposure to $O_2$, the like, or combinations thereof. However, any suitable activation process may be utilized. After the activation process, the redistribution structure 120 and/or the electronic die 122 may be cleaned using, e.g., a chemical rinse. The electronic die 122 is then aligned with the redistribution structure 120 and placed into physical contact with the redistribution structure 120. The electronic die 122 may be placed on the redistribution structure 120 using a pick-and-place process, for example. The redistribution structure 120 and the electronic die 122 may then be subjected to a thermal treatment and/or pressed against each other (e.g., by applying contact pressure) to bond the redistribution structure 120 and the electronic die 122. For example, the redistribution structure 120 and the electronic die 122 may be subjected to a pressure of about 200 kPa or less, and to a temperature between about 200° C. and about 400° C. The redistribution structure 120 and the electronic die 122 may then be subjected to a temperature at or above the eutectic point of the material of the conductive pads 116 and the die connectors 124 (e.g., between about 150° C. and about 650° C.) to fuse the conductive pads 116 and the die connectors 124. In this manner, the dielectric-to-dielectric bonding and/or metal-to-metal bonding of the redistribution structure 120 and the electronic die 122 forms a bonded structure. In some embodiments, the bonded structure is baked, annealed, pressed, or otherwise treated to strengthen or finalize the bonds. In other embodiments, the electronic die 122 may be bonded to the redistribution structure 120 using solder bonding, solder bumps, or the like.

Figure 9:
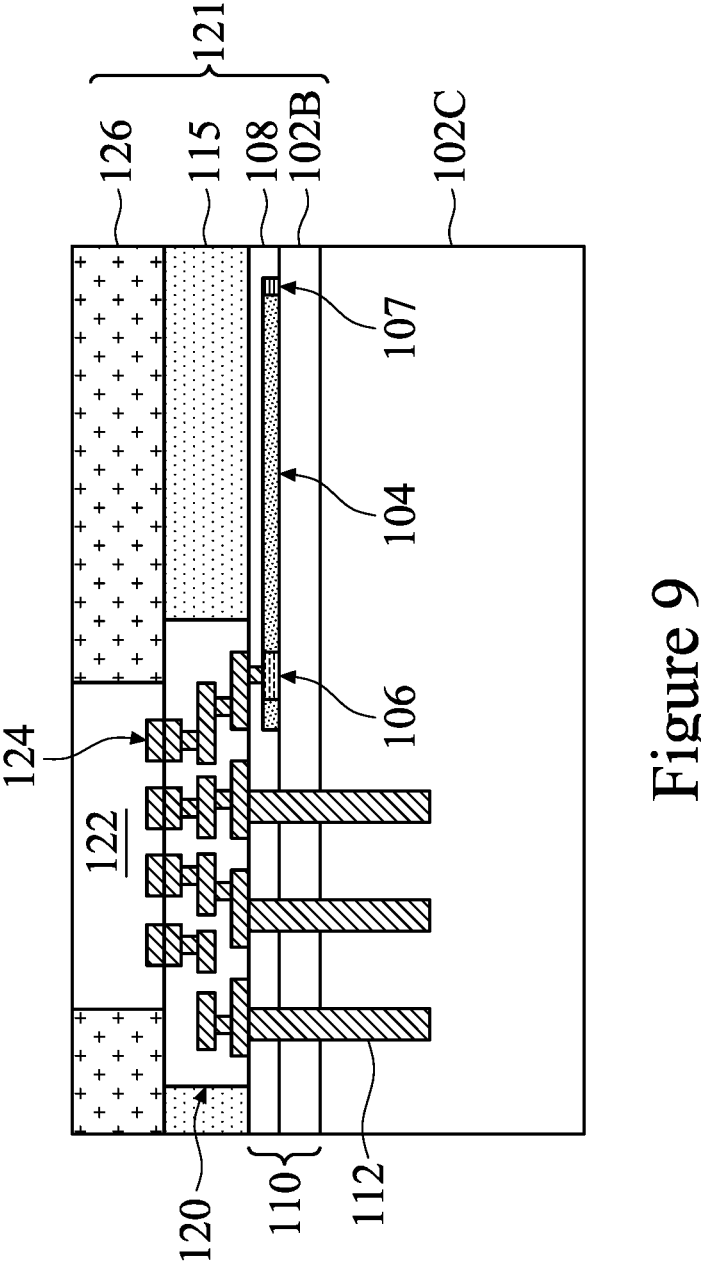

In FIG. 9, a dielectric material 126 is formed over the electronic die 122 and the redistribution structure 120, in accordance with some embodiments. The dielectric material 126 may be formed of silicon oxide, silicon nitride, a polymer, the like, or a combination thereof. The dielectric material 126 may be formed by CVD, PVD, ALD, a spin-on-dielectric process, the like, or a combination thereof. In some embodiments, the dielectric material 126 may be formed by HDP-CVD, FCVD, the like, or a combination thereof. The dielectric material 126 may be a gap-filling material in some embodiments, which may include one or more of the example materials above. Other dielectric materials formed by any acceptable process may be used. The dielectric material 126 may be planarized using a planarization process such as a CMP process, a grinding process, or the like. In some embodiments, the planarization process may expose the electronic die 122 such that a surface of the electronic die 122 and a surface of the dielectric material 126 are substantially coplanar. The oxide layer 102B, the dielectric layer 108, the dielectric layer 115 and the dielectric material 126 may be collectively referred to herein as the dielectric layers 121.

Figure 10:
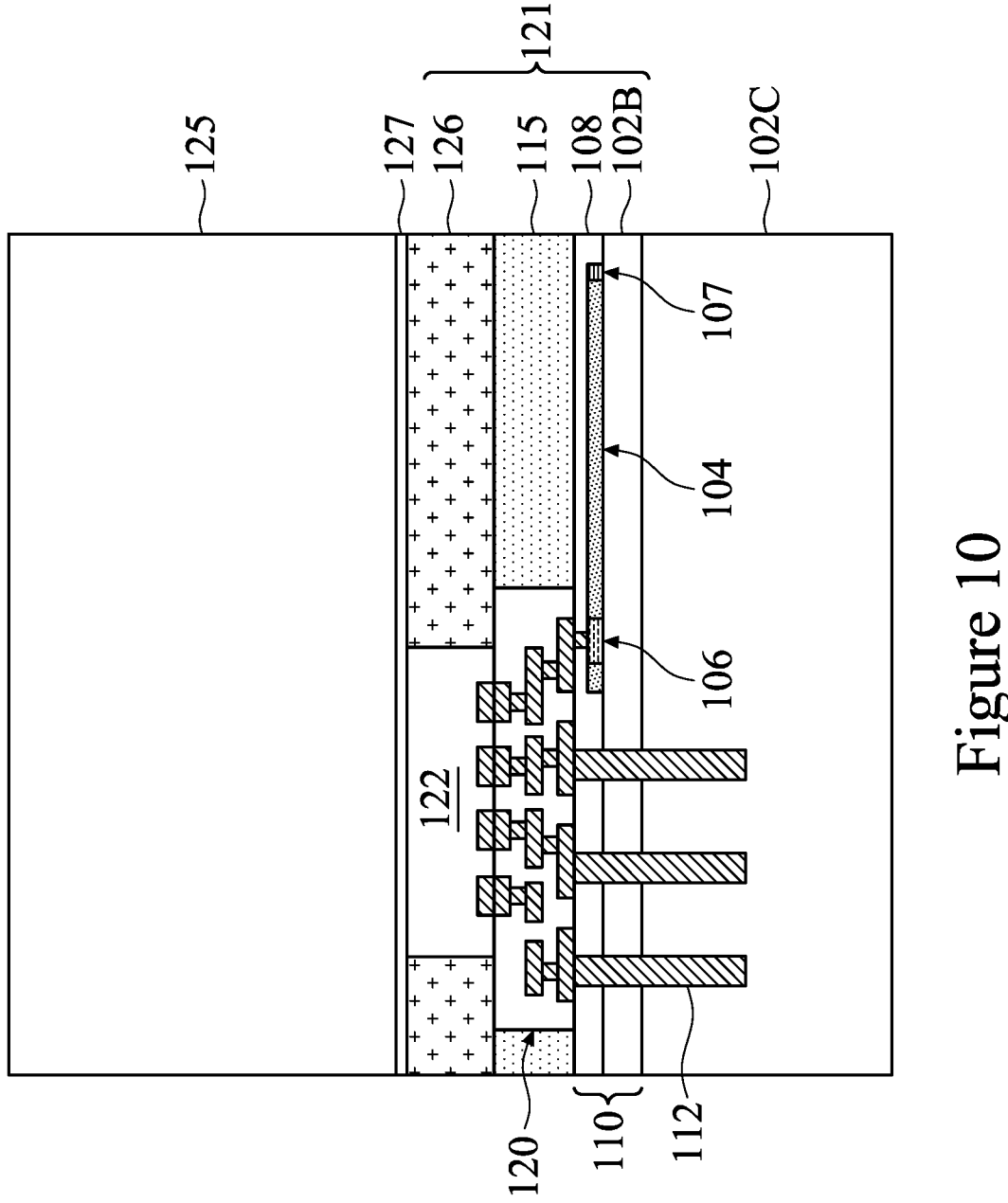

In FIG. 10, an optional support 125 is attached to the structure, in accordance with some embodiments. The support 125 is a rigid structure that is attached to the structure in order to provide structural or mechanical stability. The use of a support 125 can reduce warping or bending, which can improve the performance of the optical structures such as the waveguides 104 or photonic components 106. The support 125 may comprise one or more materials such as silicon (e.g., a silicon wafer, bulk silicon, or the like), silicon oxide, silicon oxynitride, silicon carbonitride, a metal, an organic core material, the like, or another type of material. The support 125 may be attached to the structure (e.g., to the dielectric material 126 and/or the electronic dies 122) using an adhesive layer 127, as shown in FIG. 10. In other embodiments, the support 125 may be attached using direct bonding (e.g., dielectric-to-dielectric bonding or fusion bonding) or another suitable technique. In some embodiments, the support 125 may have a thickness between about 500 μm and about 700 μm. Other thicknesses are possible. The support 125 may also have lateral dimensions (e.g., length, width, and/or area) that are greater than, about the same as, or smaller than those of the structure. In other embodiments, the support 125 is attached at a later process step during the manufacturing of the photonic package 100 than shown. In some embodiments, the support 125 may be subsequently thinned using a CMP process, grinding process, or the like.

Figure 11:
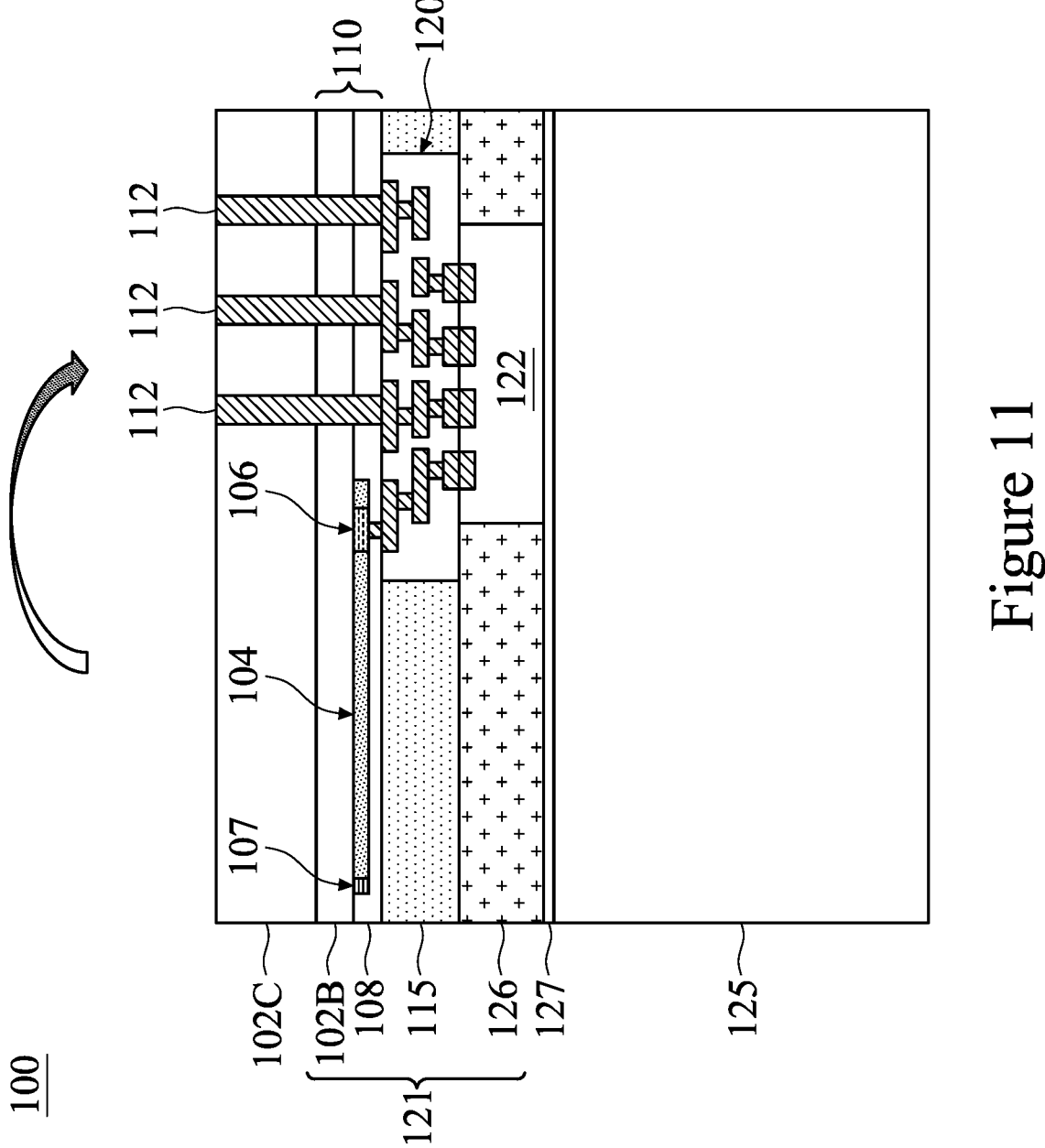

In FIG. 11, the structure is flipped over and thinned, in accordance with some embodiments. The structure may be attached to a carrier (not shown) prior to being thinned, in some cases. The back side of the substrate 102C is may be thinned to expose the vias 112, in accordance with some embodiments. The substrate 102C may be thinned using a CMP process, a mechanical grinding, an etching process, the like, or a combination thereof.

Figure 12:
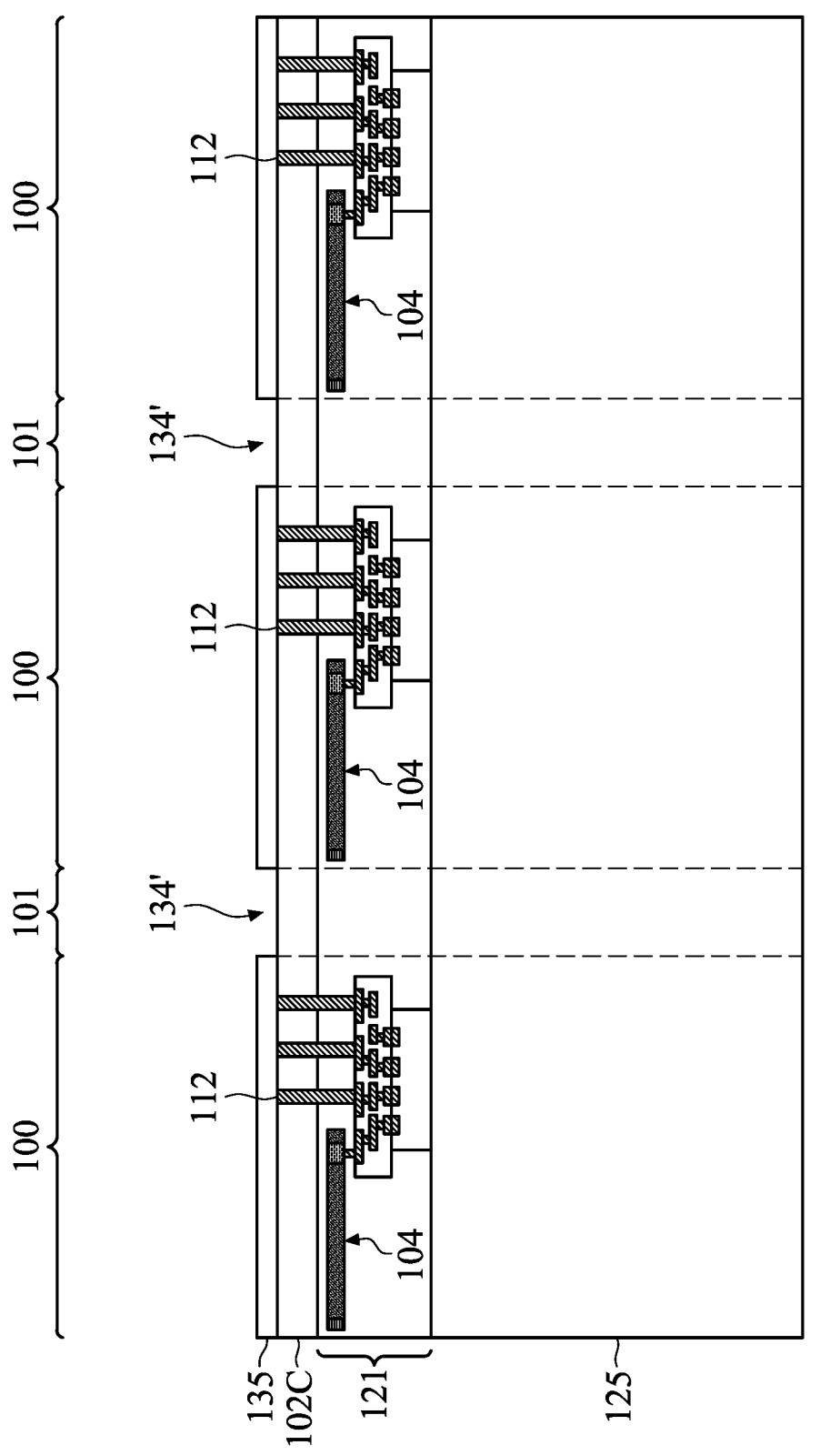

FIGS. 12 through 16 illustrate intermediate steps in the singulation of multiple photonic packages 100 formed on the substrate 102 into individual photonic packages 100, in accordance with some embodiments. FIG. 12 illustrates multiple photonic packages 100 similar to the photonic package 100, except FIG. 12 shows the photonic packages 100 before singulation. For example, the multiple photonic packages 100 of FIG. 12 may be formed concurrently on the same substrate 102 with scribe regions 101 between neighboring photonic packages 100. The scribe regions 101 are subsequently removed to singulate the photonic packages 100 into individuals. For clarity reasons, FIGS. 12 through 16 do not show all of the features or labels shown in FIG. 11. The relative sizes of various features may also be different than FIG. 11 for clarity reasons.

FIG. 12 also shows the formation of a dicing mask 135 over the back side of the photonic packages 100, in accordance with some embodiments. The dicing mask 135 may be formed, for example, by depositing one or more mask layers over the substrate 102C and the vias 112 of the photonic packages 100 and the scribe regions 101. The mask layers may then be patterned to form openings 134' that expose portions of the scribe regions 101, such as portions of the substrate 102C within the scribe regions 101. In some cases, the openings 134' are different regions of a single continuous opening. The dicing mask 135 may be patterned using suitable photolithography and etching techniques. The dicing mask 135 may comprise one or more layers of materials such as photoresist, silicon oxide, silicon nitride, metal oxide, the like, or a combination thereof. Other materials are possible. In some cases, material(s) of the dicing mask 135 may be chosen to have a slower etch rate than material(s) of the scribe regions 101, such as the materials of the substrate 102C, the dielectric layers 121, the support 125, or other features within the scribe regions 101.

Figure 13:
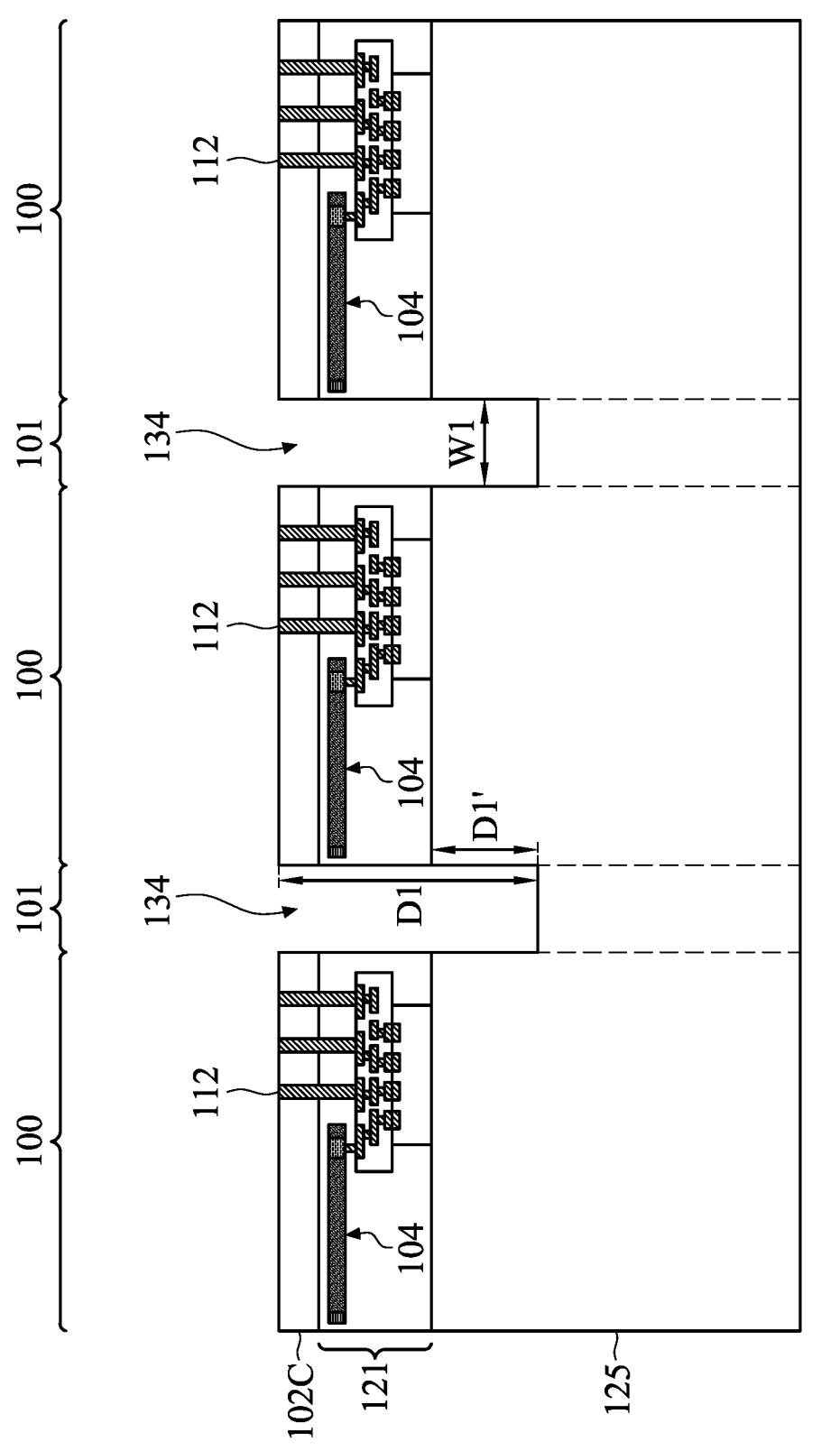

In FIG. 13, the openings 134' of the dicing mask 135 are extended using an etching process to form recesses 134 extending into the scribe regions 101, in accordance with some embodiments. The dicing mask 135 may act as an etching mask during the etching process, such that the openings 134' of the dicing mask 135 correspond to the recesses 134 in the scribe regions 101. In some embodiments, the etching process comprises an anisotropic dry etch, such as a plasma etch. In this manner, the etching process may be considered a "plasma dicing process" in some cases. The etching process may comprise one or more different dry etching steps, which may use similar or different processes. For example, different materials within the scribe regions 101 may be etched using different process gases or etching parameters. In some cases, the etching process comprises a plurality of etching cycles. For example, an etching cycle may include an etching step to extend the recesses 134 followed by depositing a passivation material or polymer on sidewalls of the recesses 134. In some embodiments, the etching process includes generating a plasma with a power in the range of about 100 Watts to about 3000 Watts. In some embodiments, the etching process may be performed at a pressure in the range of about 1 mTorr to about 100 mTorr and at a process temperature in the range of about 0° C. to about 150° C. In some embodiments, the etching process may include a bias voltage in the range of about 10 Volts to about 1000 Volts. In some embodiments, the anisotropic dry etching process may use one or more process gases such as $SF_6$, HBr, $Cl_2$, $H_2$, $N_2$, $O_2$, $C_xF_y$, $CH_xF_y$, the like, or combinations thereof. Other etching processes, etchants, process gases, or parameters are possible.

As shown in FIG. 13, the etching process forms recesses 134 extending through the substrate 102C and the dielectric layers 121 and into the support 125. In some embodiments, the recesses 134 may have a width W1 in the range of about 5 μm to about 50 μm. The sidewalls of the recesses 134 may be substantially vertical, tapered, convex, concave, or irregular. In some embodiments, the recesses 134 may have a depth D1 in the range of about 40 μm to about 100 μm. In some embodiments, the recesses 134 may extend into the support 125 a depth D1' that is in the range of about 20 μm to about 80 μm. Other depths or widths are possible. The etching process extends the recesses 134 such that some sidewall surfaces of the recesses 134 are adjacent waveguides 104 (and/or edge couplers 107 thereof) of the photonic packages 100. In some cases, a dry anisotropic etch (e.g. a plasma etch) can remove portions of the scribe regions 101 with less cracking, chipping, or thermal damage than other singulation techniques such as mechanical sawing. The use of a dry anisotropic etch for singulation can also form smoother sidewall surfaces (e.g. of the recesses 134). In some cases, a smoother sidewall surface near a waveguide or edge coupler can allow for improved optical coupling to that waveguide or edge coupler, which can allow for improved efficiency, less signal loss, and less power consumption. In this manner, the use of a dry anisotropic etch during singulation as described herein can allow for improved performance of the singulated devices.

As shown in FIG. 13, the dicing mask 135 may be removed after performing the etching process, in some embodiments. The dicing mask 135 may be removed using one or more suitable wet etching processes, dry etching processes, planarization processes (e.g., CMP or grinding processes), or the like.

Figure 14:
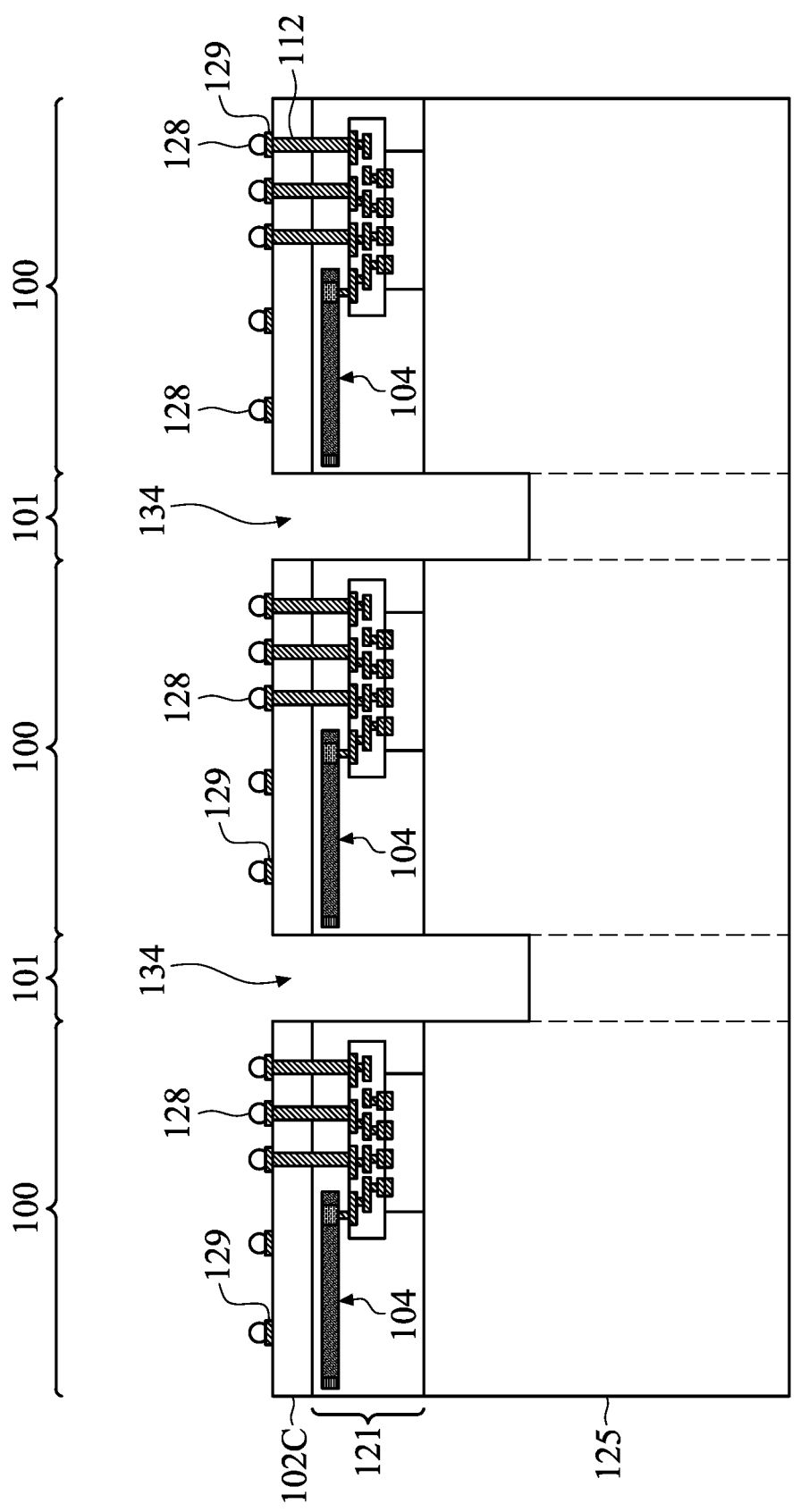

In FIG. 14, conductive connectors 128 are formed on the exposed vias 112 and the substrate 102C, in accordance with some embodiments. In some embodiments, conductive pads 129 are formed on the exposed vias 112 and the substrate 102C, and the conductive connectors 128 are formed on the conductive pads 129. The conductive pads 129 and the conductive connectors 128 may be electrically connected to the redistribution structure 120 by the vias 112. In other embodiments, the conductive connectors and/or conductive pads 129 are formed prior to forming the recesses 134 or formed after a subsequently performed process step such as those described below.

The conductive pads 129 may be conductive features such as conductive pads, conductive pillars, conductive lines, or the like. In some embodiments, the conductive pads 129 comprise under-bump metallizations (UBMs). The conductive pads 129 may be formed from one or more conductive materials such as copper, aluminum, another metal or metal alloy, the like, or a combination thereof. The conductive material of the conductive pads 129 may be formed using a suitable process, such as sputtering, printing, electro plating, electroless plating, CVD, or the like. In some embodiments, the conductive pads 129 comprise metal pillars (e.g., copper pillars or the like), which may be solder free and have substantially vertical sidewalls. In some embodiments, a metal cap layer (not shown) is formed on the conductive pads 129. The metal cap layer may include nickel, tin, tin-lead, gold, silver, palladium, indium, nickel-palladium-gold, nickel-gold, the like, or a combination thereof and may be formed by a plating process. In some embodiments, a passivation layer (not shown) may be formed over the substrate 102C to surround or partially cover the conductive pads 129. The passivation layer may comprise a dielectric material such as silicon oxide, silicon nitride, or the like. Other materials or techniques are possible. In other embodiments, conductive pads 129 are not formed.

Still referring to FIG. 14, conductive connectors 128 may be formed on the conductive pads 129, in accordance with some embodiments. The conductive connectors 128 may be, for example, ball grid array (BGA) connectors, solder balls, metal pillars, controlled collapse chip connection (C4) bumps, micro bumps, electroless nickel-electroless palladium-immersion gold technique (ENEPIG) formed bumps, or the like. The conductive connectors 128 may include a conductive material such as solder, copper, aluminum, gold, nickel, silver, palladium, tin, the like, or a combination thereof. In some embodiments, the conductive connectors 128 are formed by initially forming a layer of solder using a suitable technique such as evaporation, electroplating, printing, solder transfer, ball placement, or the like. Once a layer of solder has been formed on the structure, a reflow may be performed in order to shape the material into the desired bump shapes. In another embodiment, the conductive connectors 128 are metal pillars (such as copper pillars) formed by a sputtering, printing, electro plating, electroless plating, CVD, or the like. The metal pillars may be solder free and have substantially vertical sidewalls. In some embodiments, a metal cap layer (not shown) is formed on the top of the conductive connectors 128. The metal cap layer may include nickel, tin, tin-lead, gold, silver, palladium, indium, nickel-palladium-gold, nickel-gold, the like, or a combination thereof and may be formed by a plating process. Other materials or techniques are possible.

Figure 15:
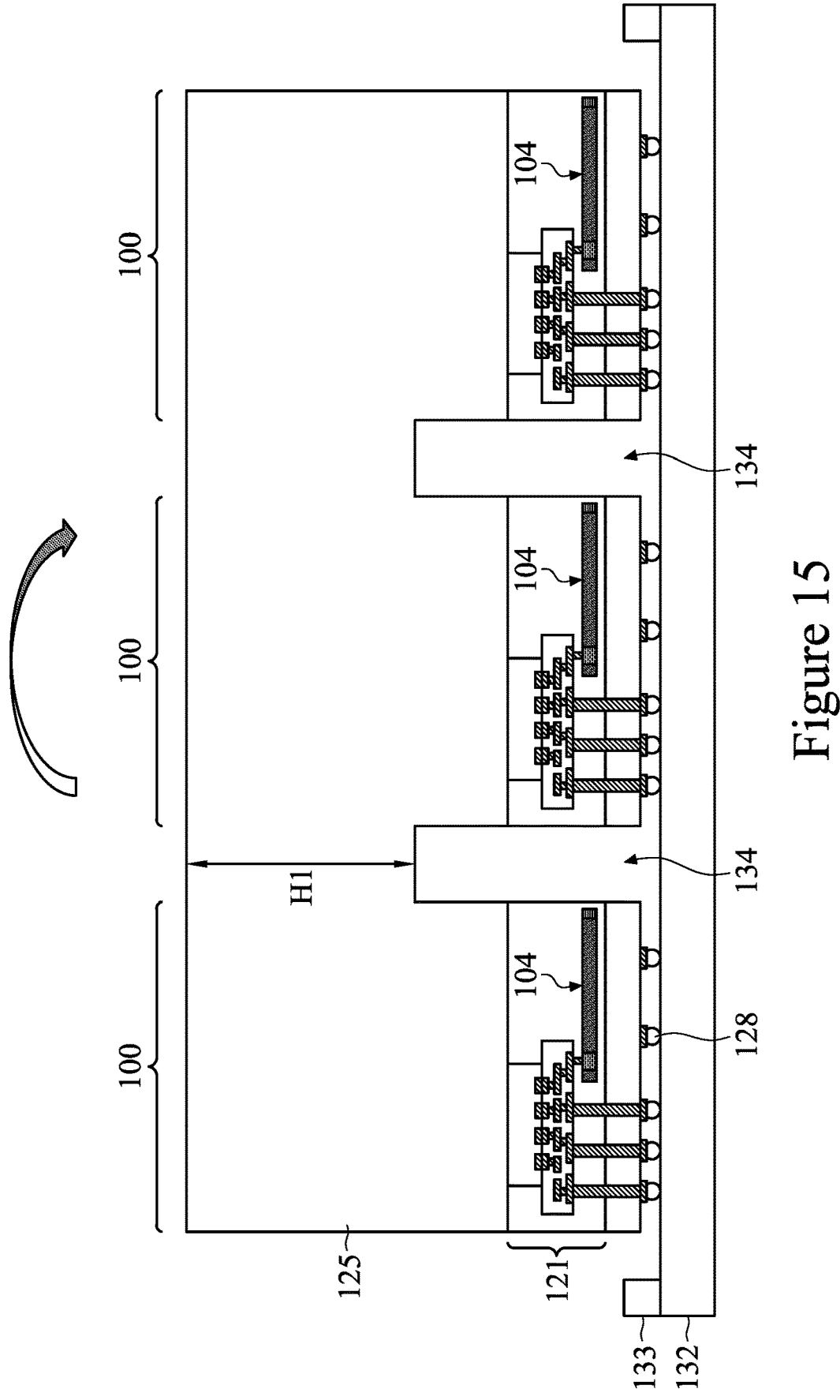

In FIG. 15, the structure is flipped over and attached to a carrier 132, in accordance with some embodiments. The carrier 132 may be, for example, a tape supported by a frame 133. Other types of carriers are possible. The recesses 134 extend from a back surface of the structure (e.g. a back side surface of the substrate 102C) toward a front surface of the structure (e.g., a front side surface of the support 125). Accordingly, the recesses 134 may be subsequently referred to as "bottom recesses 134." As shown in FIG. 15, the bottom recesses 134 extend incompletely through the structure (e.g. only partway into the support 125), and a portion of the support 125 remains over the recesses 134. The remaining portions of the support 125 may have a height H1 that is in the range of about 250 μm to about 720 μm, though other heights are possible.

Figure 16:
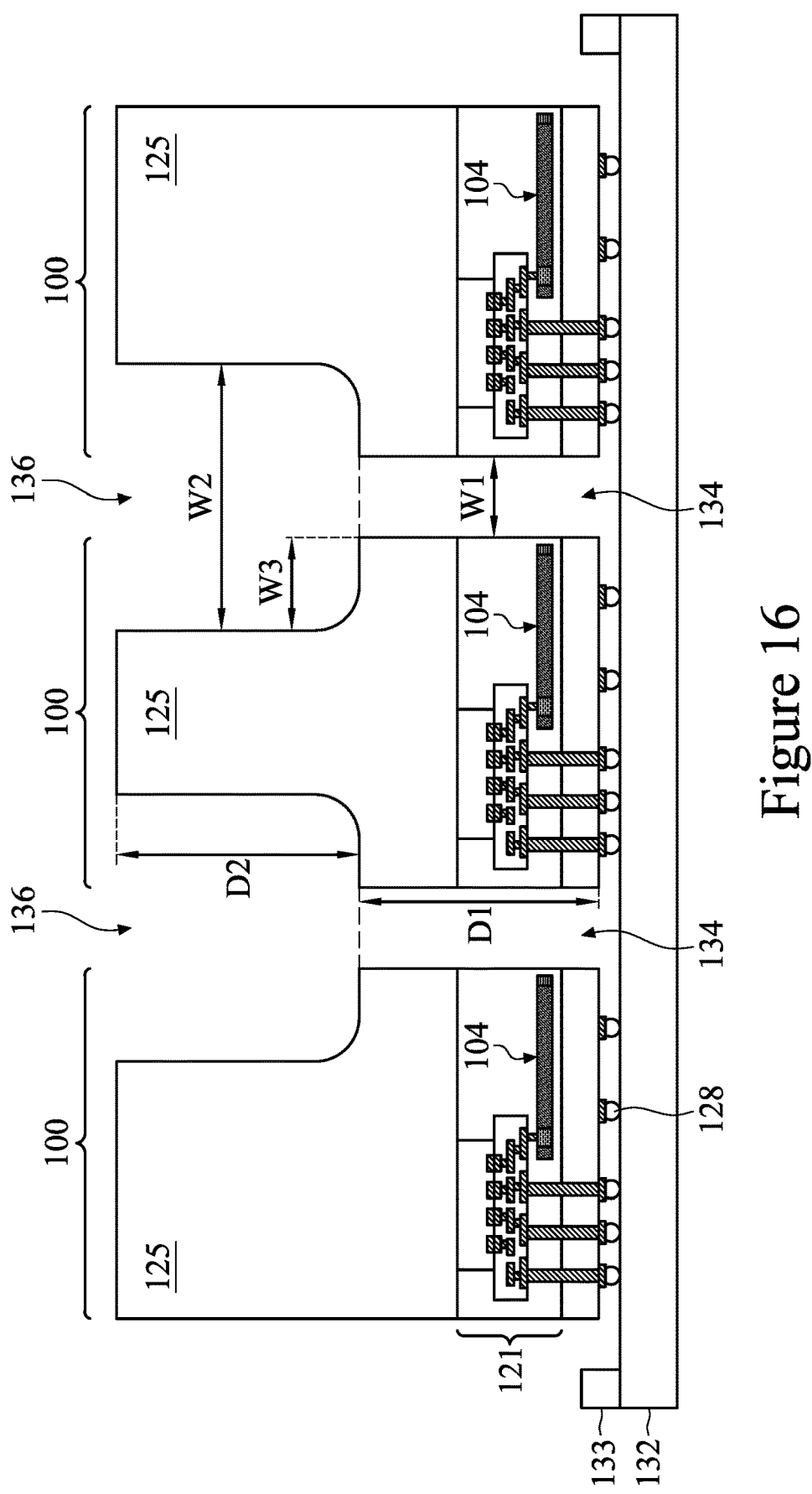

In FIG. 16, a sawing process is performed to fully singulate the photonic packages 100 into individual photonic packages 100, in accordance with some embodiments. The sawing process may be, for example, a mechanical sawing or dicing process using one or more blades. As shown in FIG. 16, the sawing process forms recesses 136 that extend from a front surface of the structure (e.g., a front side surface of the support 125) toward a back surface of the structure (e.g. a back side surface of the substrate 102C). Accordingly, the recesses 136 may be subsequently referred to as "top recesses 136." The top recesses 136 may be aligned with the bottom recesses 134 such that top recesses 136 laterally overlap corresponding bottom recesses 134. As shown in FIG. 16, the top recesses 136 may extend incompletely through the support 125, but extend deep enough that the remaining portions of the support 125 that cover the bottom recesses 134 are removed. In other words, the combination of the bottom recesses 134 and the top recesses 136 forms openings that extend completely through the structure. In this manner, forming both the bottom recesses 134 and the top recesses 136 fully removes material between adjacent photonic packages 100, singulating the photonic packages 100 into separate, individual photonic packages 100. Top recesses 136 may be formed on a single side of a photonic package 100, all sides of a photonic package 100, or on only some of the sides of a photonic package 100. In some embodiments, a top recess 136 may be formed over a waveguide 104. In some embodiments, a top recess 136 may be a recess in a corner of the support 125. In other words, a top recess 136 may be a recess in both a top surface of the support 125 and a sidewall surface of the support 125.

The top recesses 136 may be formed having a depth D2 from a front surface of the support 125 that is the about the same or greater than the height H1 (see FIG. 16). In other words, the bottom of the top recesses 136 may be approximately vertically aligned with the top of the bottom recesses 134, or the bottom of the top recesses 136 may extend below the top of the bottom recesses 134. In this manner, the top recesses 136 expose the bottom recesses 134. In some cases, the bottom recesses 134 have a smaller depth D1 after formation of the top recesses 136. After forming the top recesses 136, the depth D2 may be greater than, about the same as, or less than the depth D1. The depth D2 is less than the thickness of the support 125, in some embodiments. In some embodiments, the depth D2 of the top recesses 136 may be in the range of about 270 μm to about 740 μm. Other depths are possible.

The top recesses 136 may have sidewalls with substantially vertical profiles. In some cases, the sidewalls of the top recesses 136 near the bottom of the top recesses 136 may have tapered, narrowing, angled, curved, or rounded profiles. As an example, FIG. 16 shows top recesses 136 that have vertical upper sidewalls and rounded lower sidewalls. In this manner, the top recesses 136 may have a width W2 between vertical sidewall regions of the top recesses 136 and a relatively smaller width(s) near the bottom of the top recesses 136. In some embodiments, a width W2 between vertical sidewall regions of the top recesses 136 is in the range of about 50 μm to about 200 μm. In some embodiments, a width W3 between a sidewall of a bottom recess 134 and a vertical sidewall region of an adjacent top recess 136 is in the range of about 15 μm to about 90 μm. Other widths are possible. The width W2 of the top recesses 136 may be controlled, for example, by choosing an appropriate sawing blade having an appropriate width. In some embodiments, the top recesses 136 have a width W2 that is greater than a width W1 of the bottom recesses 134. In some embodiments, the width W1 may be between about 4% and about 60% of the width W2. In some embodiments, different vertical sidewall regions of the top recesses 136 may have different widths, examples of which are described in greater detail below for FIG. 17B.

Figure 17A:
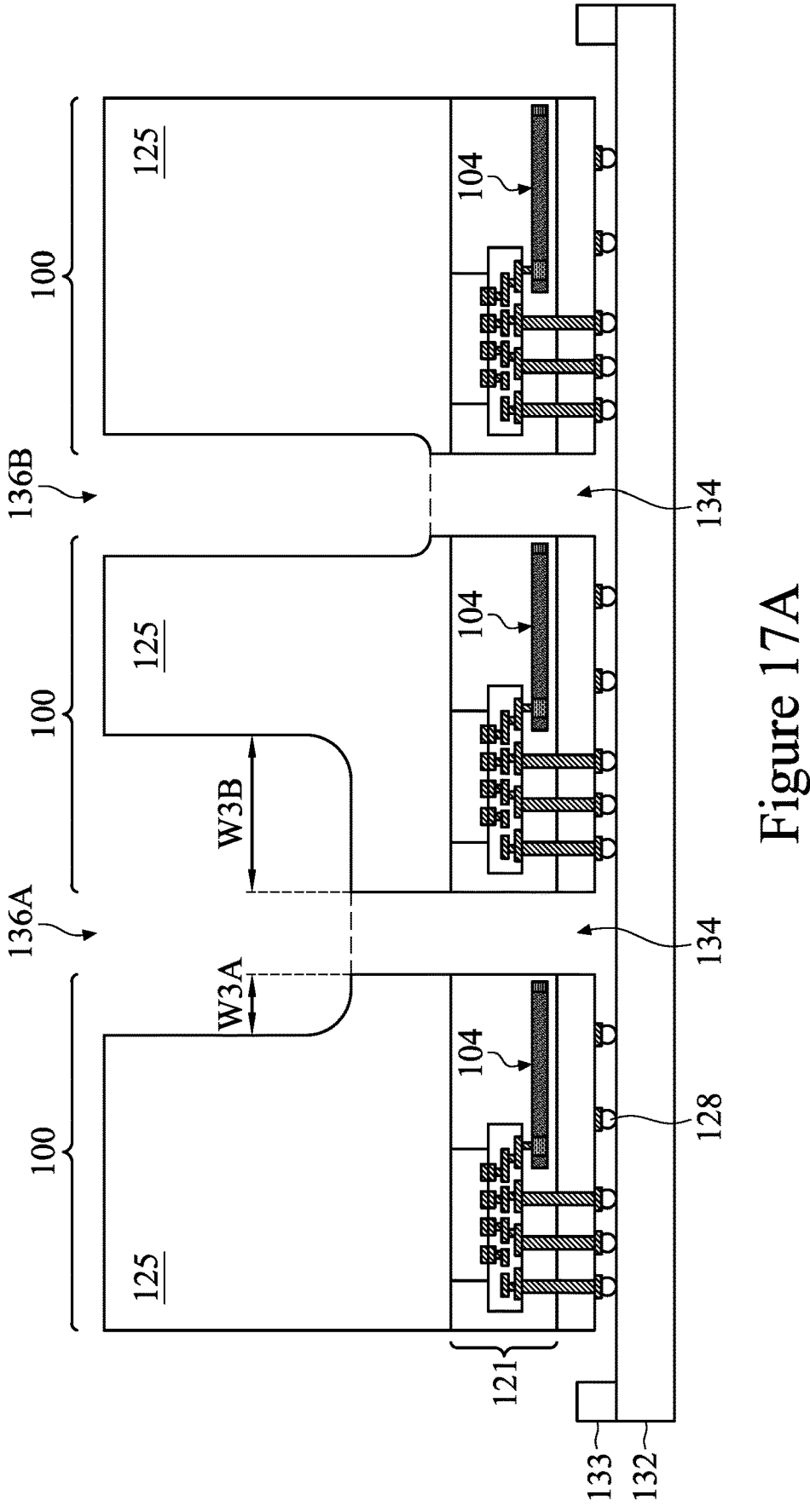
FIGS. 17A and 17B illustrate cross-sectional views of photonic packages, in accordance with some embodiments.
Figure 17B:
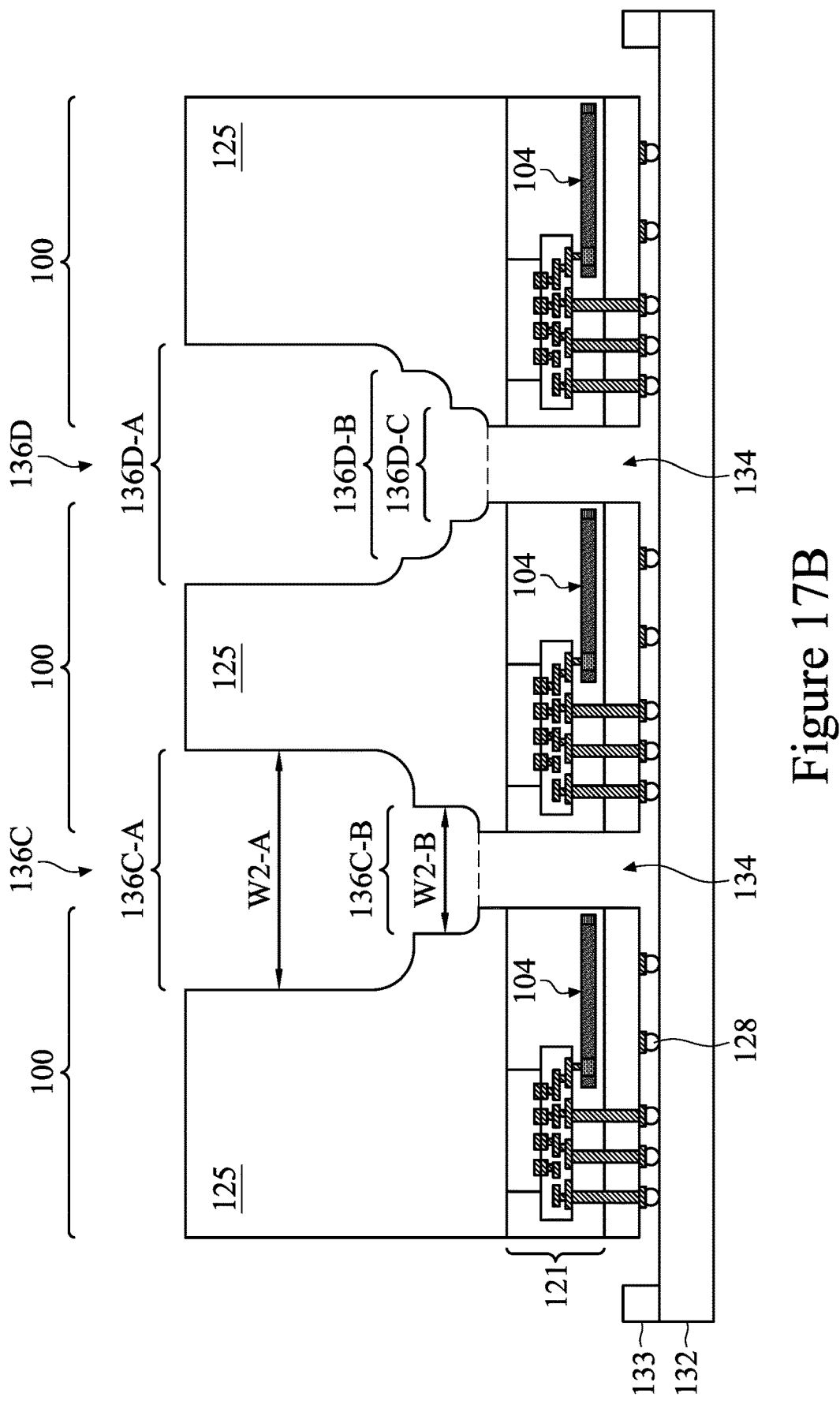

The top recesses 136 shown in FIG. 16 are examples, and top recesses 136 may have different shapes, sizes, or relative locations in other embodiments. FIGS. 17A and 17B show non-limiting examples of top recesses 136A-D that have other characteristics than those shown in FIG. 16. FIG. 17A shows top recesses 136A and 136B that illustrate top recesses 136 may have a variety of widths and depths. For example, top recess 136A has a smaller depth and a larger width than the top recess 136 of FIG. 16, and top recess 136B has a larger depth and a smaller width than the top recess 136 of FIG. 16. In this manner, a top recess 136 may have any suitable width or depth, and other combinations of various widths and depths are possible. Additionally, in some cases, the top recess 136 may not be not laterally centered with respect to the underlying bottom recess 134, as shown by top recess 136A. For example, in some cases, a lateral distance from a first vertical sidewall of a top recess 136 to an adjacent first sidewall of a bottom recess 134 (e.g. a first width W3A) may be different from a lateral distance from a second vertical sidewall of that top recess 136 to an adjacent second sidewall of that bottom recess 134 (e.g., a second width W3B). The first width W3A may be greater than, less than, or about the same as the second width W3B. In other words, neighboring photonic packages 100 may have top recesses 136 of similar dimensions or of different dimensions.

FIG. 17B illustrates examples of top recesses 136C and 136D that have multiple regions with different widths, in accordance with some embodiments. For example, top recess 136C has an upper recess region 136C-A that has a width W2-A and a lower recess region 136C-B that has a width W2-B, in which the width W2-B is smaller than the width W2-A. Top recesses may have more than two regions with different widths, in other embodiments. For example, top recess 136D has a first recess region 136D-A, a second recess region 136D-B, and a third recess region 136D-C, each of which have different widths. A top recess having more than three recess regions is possible.

The different widths of the top recesses may be formed by the utilization of multiple blades during formation of the top recess. For example, the top recess 136C may be formed by sawing using a first blade having a width corresponding to width W2-A to form the first recess region 136C-A, and then sawing using a second blade having a width corresponding to width W2-B to form the second recess region 136C-B. In this example, the second blade has a width that is less than the width of the first blade. In other embodiments, more than two blades may be used to form a top recess 136, and the blades may be utilized in any suitable order to form a top recess 136. The various recess regions formed by the various blades for a top recess may have any suitable widths or depths. A recess region may extend below the bottom surface of another recess region. In some cases, the various regions formed by the various blades may not all by laterally centered. In some cases, the use of multiple blades to form multiple recess regions can allow for a top recess 136 to have an generally tapered shape or "funnel shape," which can facilitate flow of an optical glue (described in greater detail below). Additionally, the use of multiple blades in this manner can reduce the risk of damage to the photonic package 100 during the formation of the top recess 136. The various depths, widths, or locations of the recess regions may be different than shown, and any suitable combination of blades or sawing processes of any suitable characteristics may be used.

Figure 18A:
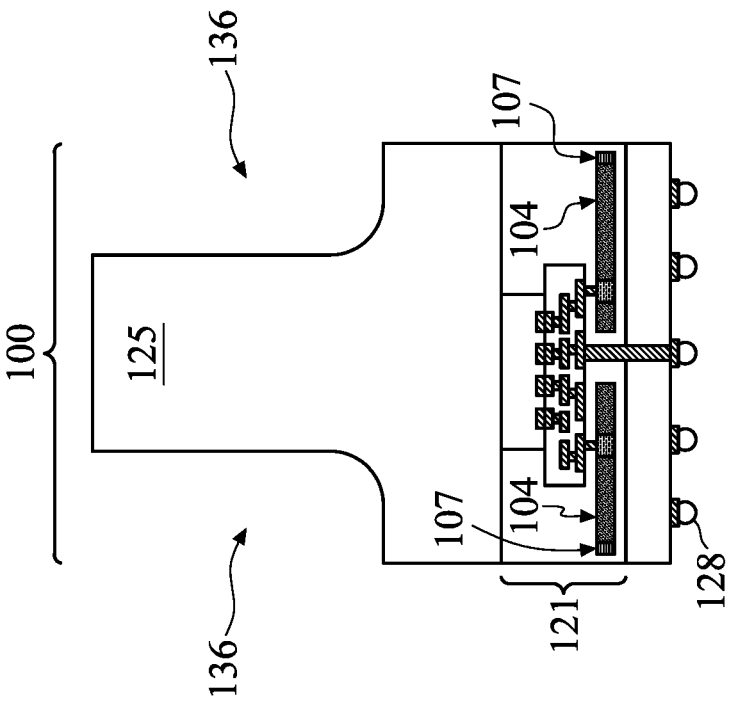
FIGS. 18A, 18B, and 18C illustrate cross-sectional views of photonic packages, in accordance with some embodiments.
Figure 18B:
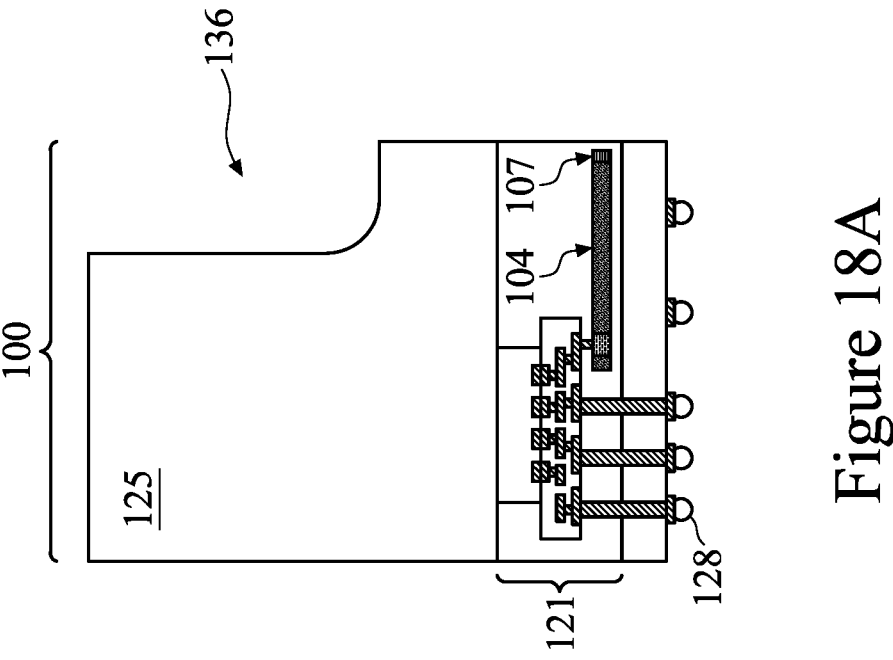

FIGS. 18A and 18B illustrate cross-sectional views of photonic packages 100, in accordance with some embodiments. The photonic packages 100 may be similar to those described previously for FIGS. 1 through 17B, and may be formed using similar techniques. As shown in FIGS. 18A-18B, a photonic package 100 may have one top recess 136 or more than one top recess 136. Additionally, a photonic package 100 may have one edge coupler 107 adjacent one sidewall or multiple edge couplers 107 adjacent multiple respective sidewalls. A top recess 136 may or may not be formed in a sidewall adjacent to an edge coupler 107. These are examples, and other configurations of photonic packages 100 are possible in other embodiments.

Figure 18C:
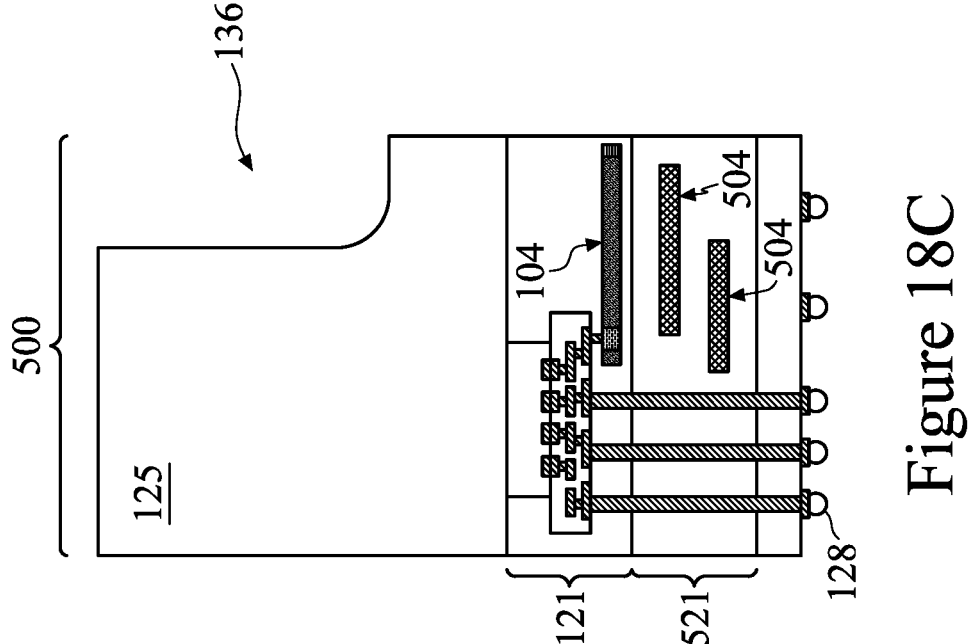

FIG. 18C illustrates a cross-sectional view of a photonic package 500, in accordance with some embodiments. The photonic package 500 is similar to the photonic package 100 of FIG. 18A, except that silicon nitride waveguides 504 (e.g., "SiN waveguides") are formed in addition to the waveguides 104. The SiN waveguides 504 may be optically coupled to each other and/or to the waveguides 104, such as by one or more grating couplers. In this manner, optical signals and/or optical power may be transmitted between SiN waveguides 504 and/or between SiN waveguides 504 and waveguides 104. In some embodiments, the SiN waveguides 504 may be formed by performing manufacturing steps similar to those described for FIGS. 1-10, and then removing the substrate 102 to expose the oxide layer 102B. Various dielectric layers 521 may then be deposited on the oxide layer 102B, with the SiN waveguides 504 formed between various dielectric layers. The dielectric layers 521 may be similar to the dielectric layers 121 described previously. The SiN waveguides 504 may be formed, for example, by depositing a layer of silicon nitride and then patterning the layer of silicon nitride using suitable photolithography and etching techniques. In some cases, waveguides formed from silicon nitride may have less optical loss than waveguides formed from silicon. Thus, the use of SiN waveguides 504 in a photonic package such as photonic package 500 may improve device performance, in some cases.

Figure 19:
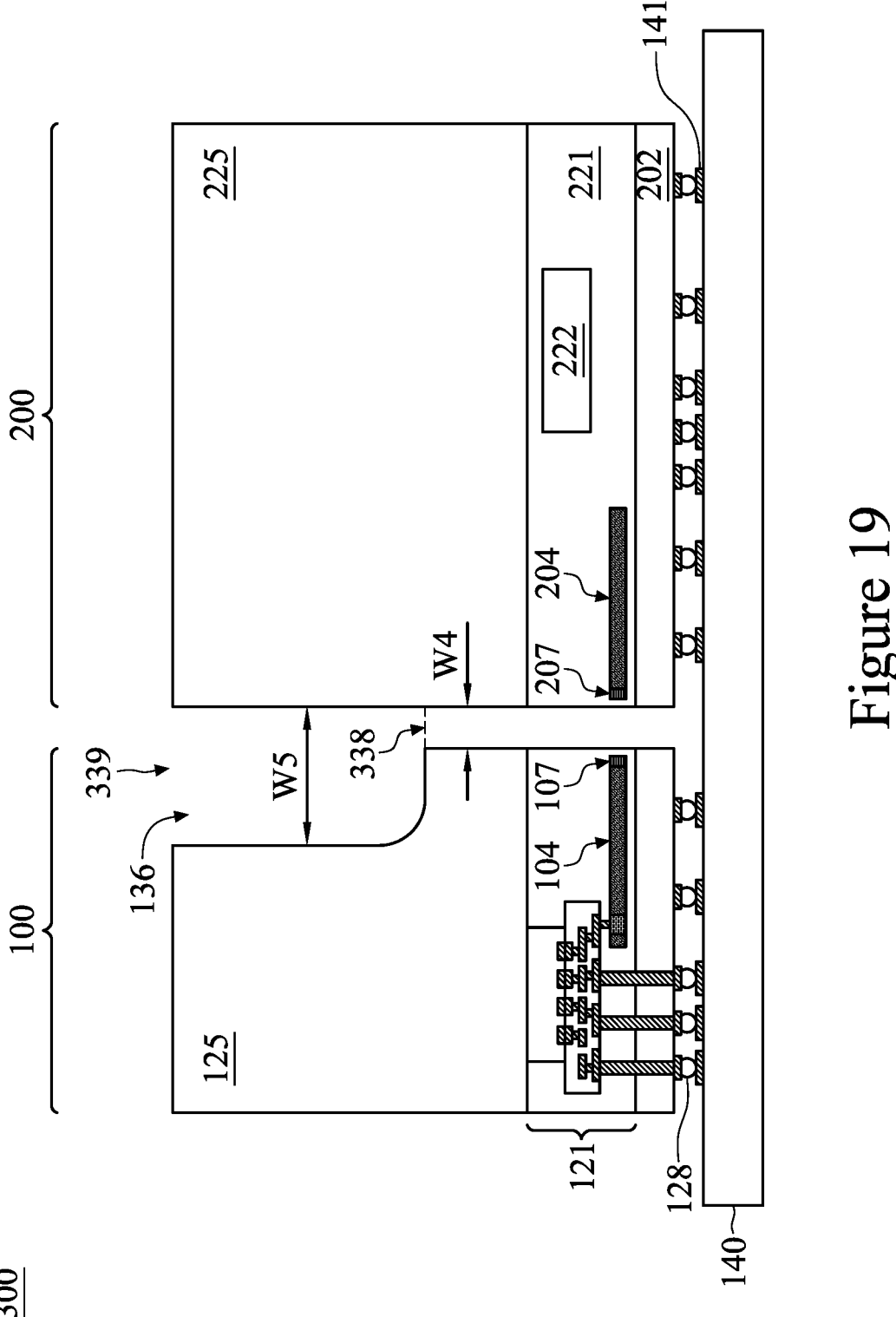
FIG. 19 illustrates a cross-sectional view of a photonic system, in accordance with some embodiments.

FIG. 19 illustrates a photonic system 300, in accordance with some embodiments. The photonic system 300 includes one or more photonic packages that are attached to an interconnect substrate 140. For example, FIG. 19 shows photonic packages including a first photonic package 100 and a second photonic package 200 that are attached to the interconnect substrate 140, though a different number of photonic packages may be attached to an interconnect substrate in other embodiments. One or both of the first photonic package 100 and the second photonic package 200 may be collectively referred to as "photonic packages 100/200" herein. Lower sidewalls of the photonic packages 100/200 are separated by a lower gap 338 and upper sidewalls of the photonic packages 100/200 are separated by an upper gap 339, in accordance with some embodiments.

The interconnect substrate 140 may be for example, a glass substrate, a ceramic substrate, a dielectric substrate, an organic substrate (e.g., an organic core), a semiconductor substrate (e.g., a semiconductor wafer), the like, or a combination thereof. In some embodiments, the interconnect substrate 140 includes conductive pads 141 and conductive routing (e.g., conductive lines, vias, redistribution structures, or the like). The interconnect substrate 140 may include passive or active devices, in some embodiments. In some embodiments, the interconnect substrate 140 may be another type of structure, such as an integrated fan-out structure, a redistribution structure, or the like. The conductive connectors 128 of the photonic packages 100/200 may be bonded to the conductive pads 141 of the interconnect substrate 140, forming electrical connections between the photonic packages 100/200 and the interconnect substrate 140. For example, the conductive connectors 128 of the photonic packages 100/200 may be placed in physical contact with the conductive pads 141, and then a reflow process may be performed to bond solder material of the conductive connectors 128 to the conductive pads 141.

The photonic packages 100/200 of the photonic system 300 may be similar to the photonic packages 100 and/or 500 described previously, such as those described for FIGS. 18A-18C or elsewhere herein. The photonic packages 100/200 may be formed using techniques or process steps described for FIG. 18A-18C, though other techniques or process steps are possible. The photonic packages 100/200 of the photonic system 300 may be similar or different from each other. For example, the first photonic package 100 shown in FIG. 19 is similar to the photonic package 100 of FIG. 18A, but the second photonic package 200 shown in FIG. 19 is different from the first photonic package 100. The second photonic package 200 of FIG. 19 may be similar to other photonic packages described herein, and may have similar features formed using similar techniques. For example, the second photonic package 200 may comprise dielectric layers 221 over a substrate 202 and a support 225 over the dielectric layers 221. The second photonic package 200 may comprise one or more waveguides 204 within the dielectric layers 221 and one or more edge couplers 207 and an electronic die 222. One or more of the edge couplers 207 may be adjacent the sidewall facing the first photonic package 100. Other photonic packages, configurations, or arrangements are possible.

The photonic packages 100/200 of the photonic system 300 may be, for example, semiconductor devices, chips, dies, system-on-chip (SoC) devices, system-on-integrated-circuit (SoIC) devices, other packages, the like, or a combination thereof. The photonic packages may include one or more processing devices, such as a central processing unit (CPU), a graphics processing unit (GPU), an application-specific integrated circuit (ASIC), a high performance computing (HPC) die, the like, or a combination thereof. The photonic packages may include one or more memory devices, which may be a volatile memory such as dynamic random-access memory (DRAM), static random-access memory (SRAM), high-bandwidth memory (HBM), another type of memory, or the like. The photonic packages may be attached to the interconnect substrate 140, and an underfill (not shown) may optionally be formed between the photonic packages and the interconnect substrate 140. In other embodiments, one or more semiconductor devices that are not photonic packages (not shown) may also be connected to the interconnect substrate 140. The semiconductor devices may have features similar to any of the devices described above or may be a different type of semiconductor device.

In some embodiments, adjacent photonic packages of the photonic system 300 may be optically coupled. For example, the edge coupler 107 of the first photonic package 100 may be aligned across the lower gap 338 to the edge coupler 207 of the second photonic package 200 such that optical signals and/or optical power may be transmitted across the lower gap 338 between the edge coupler 107 and the edge coupler 207. In this manner, optical signals and/or optical power may be transmitted between the photonic packages 100/200. For example, in some embodiments, the second photonic package 200 may comprise an optical power source 222 (e.g., a laser diode or the like), with optical power provided to the first photonic package 100 from the second photonic package 200. An optical glue may be deposited in the gap 338 between the edge couplers 107/207 to improve optical coupling between the edge couplers 107/207, described in greater detail below. A single photonic package may be optically coupled to more than one adjacent photonic package, in some embodiments. In some embodiments, a photonic package may also be optically coupled to an external optical fiber by a coupler such as an edge coupler or a grating coupler.

In some embodiments, a lower gap 338 may separate sidewalls of the dielectric layers 121/221 and/or sidewalls of the substrates 102/202 of the photonic packages 100/200. In some embodiments, the lower gap 338 between the first photonic package 100 and the second photonic package 200 may have a width W4 that is in the range of about 5 μm to about 100 μm, though other distances are possible. In some cases, a lower gap 138 having a smaller width (e.g. W4) may increase coupling efficiency between the photonic packages 100/200, reduce coupling loss between the photonic packages 100/200, and improve the optical coupling between photonic packages 100/200. The formation of top recesses

136 as described herein can allow for improved deposition of optical glue that allows for smaller gaps 138 between photonic packages 100/200, described in greater detail below. In this manner, the optical coupling between photonic packages may be improved and thus device performance may be improved.

In some embodiments, an upper gap 339 may separate sidewalls of the supports 125/225, in accordance with some embodiments. The upper gap 339 may include presence one or more top recesses 136, and thus may have a width W5 that is greater than a width W4 of the lower gap 338. In this manner, the width W5 of an upper gap 339 may be about equal to the width W3 of the top recess 136 (see FIG. 16) plus the width W4 of the lower gap 338. In some embodiments, the upper gap 339 between the first photonic package 100 and the second photonic package 200 may have a width W5 that is in the range of about 15 μm to about 190 μm, though other distances are possible.

Other combinations or configurations of top recesses may result in upper gaps 339 having other shapes, profiles, or widths. For example, upper gaps 339 are shown in FIGS. 20A-20D having different characteristics, in accordance with some embodiments. FIGS. 20A-20D illustrate portions of photonic systems that may be similar to the photonic system 300. The upper gaps 339 shown in FIGS. 20A-20D are intended as non-limiting examples for illustrative purposes, and other upper gaps 339 having other characteristics are possible.

Figure 20B:
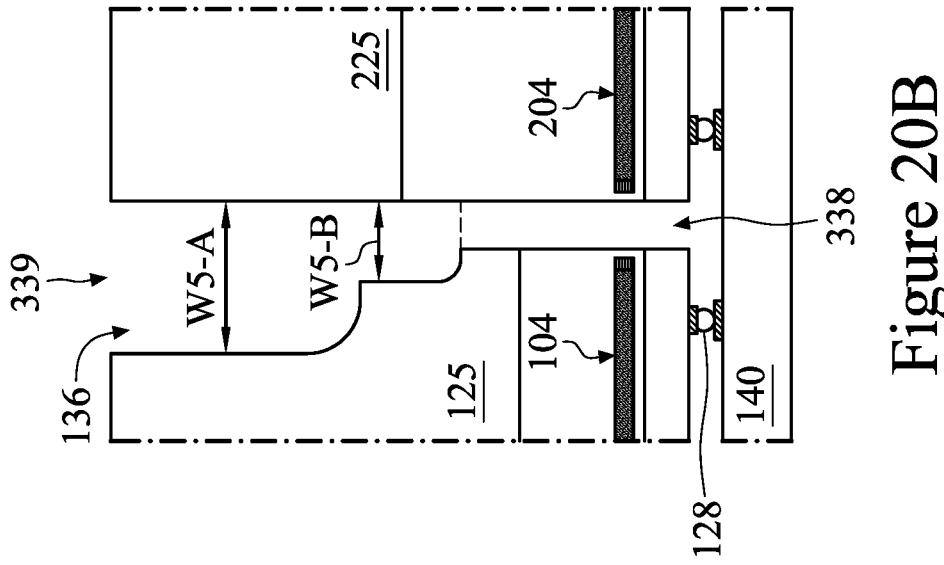
FIGS. 20A, 20B, 20C, and 20D illustrate cross-sectional views of a photonic system, in accordance with some embodiments.
Figure 20A:
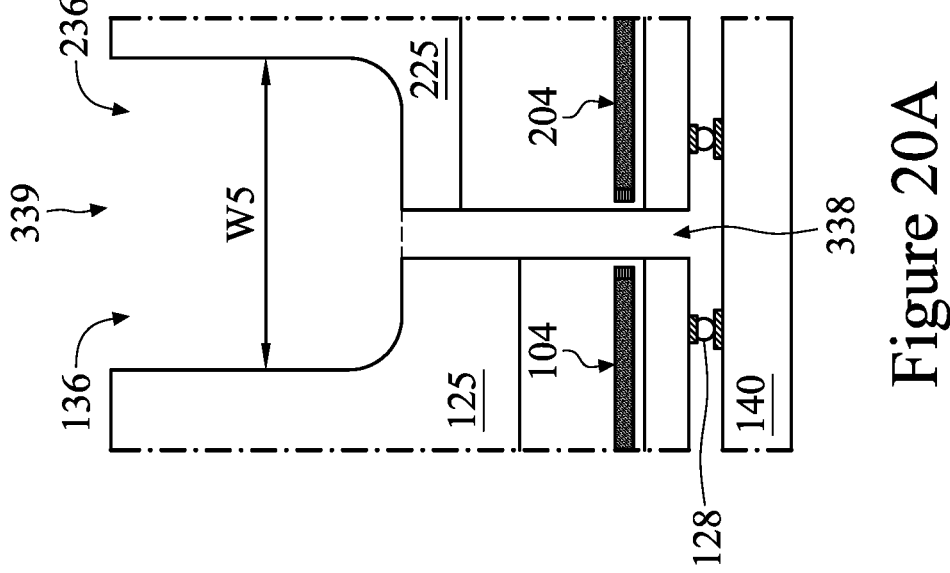

FIG. 20A illustrates a photonic system 300 in which the first photonic package 100 has a top recess 136 and the second photonic package 200 has a top recess 236. The top recesses 136/236 may have similar or different dimensions or shapes. The total width W5 of the upper gap 339 may be about equal to the width W3 (see FIG. 16) of the top recess 136 plus the width W3 of the top recess 236. In some cases, a larger width W5 may allow for more alignment tolerance and less overflow when depositing an optical glue, described in greater detail below.

Figure 20D:
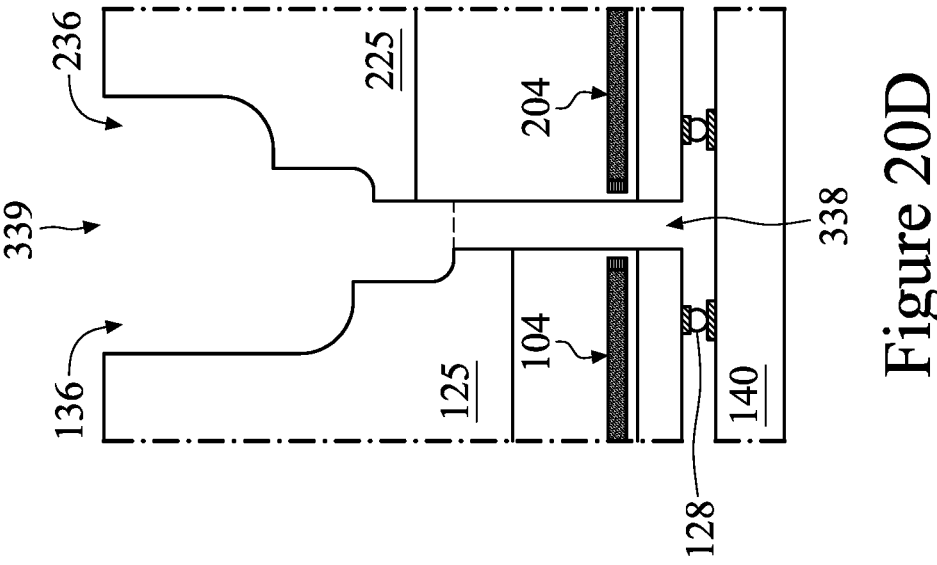
Figure 20C:
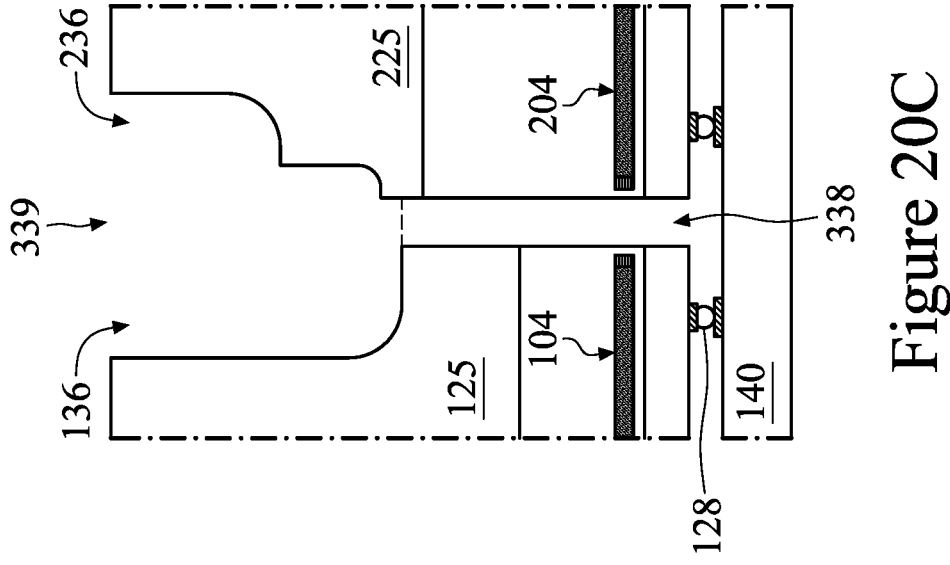

FIG. 20B illustrates a photonic system 300 in which the first photonic package 100 has a top recess 136 with multiple recess regions and the second photonic package 200 is without a top recess 136. Due to the multiple recess regions of the top recess 136, the upper gap 339 has multiple widths. For example, the upper gap 339 is shown as having a first width W5-A corresponding to a first recess region of the top recess 136 and a second width W5-B corresponding to a second recess region of the top recess 136. FIG. 20C illustrates a photonic system 300 in which the first photonic package 100 has a top recess 136 with a single recess region (e.g., similar to the first photonic package of FIG. 19) and the second photonic package 200 has a top recess 236 with multiple recess regions. FIG. 20D illustrates a photonic system 300 in which the first photonic package 100 has a top recess 136 with multiple recess regions and the second photonic package 200 has a top recess 236 with multiple recess regions. These are examples, and other combinations of top recesses, recess regions, or widths are possible.

Figures 21A, 21B, 21C:
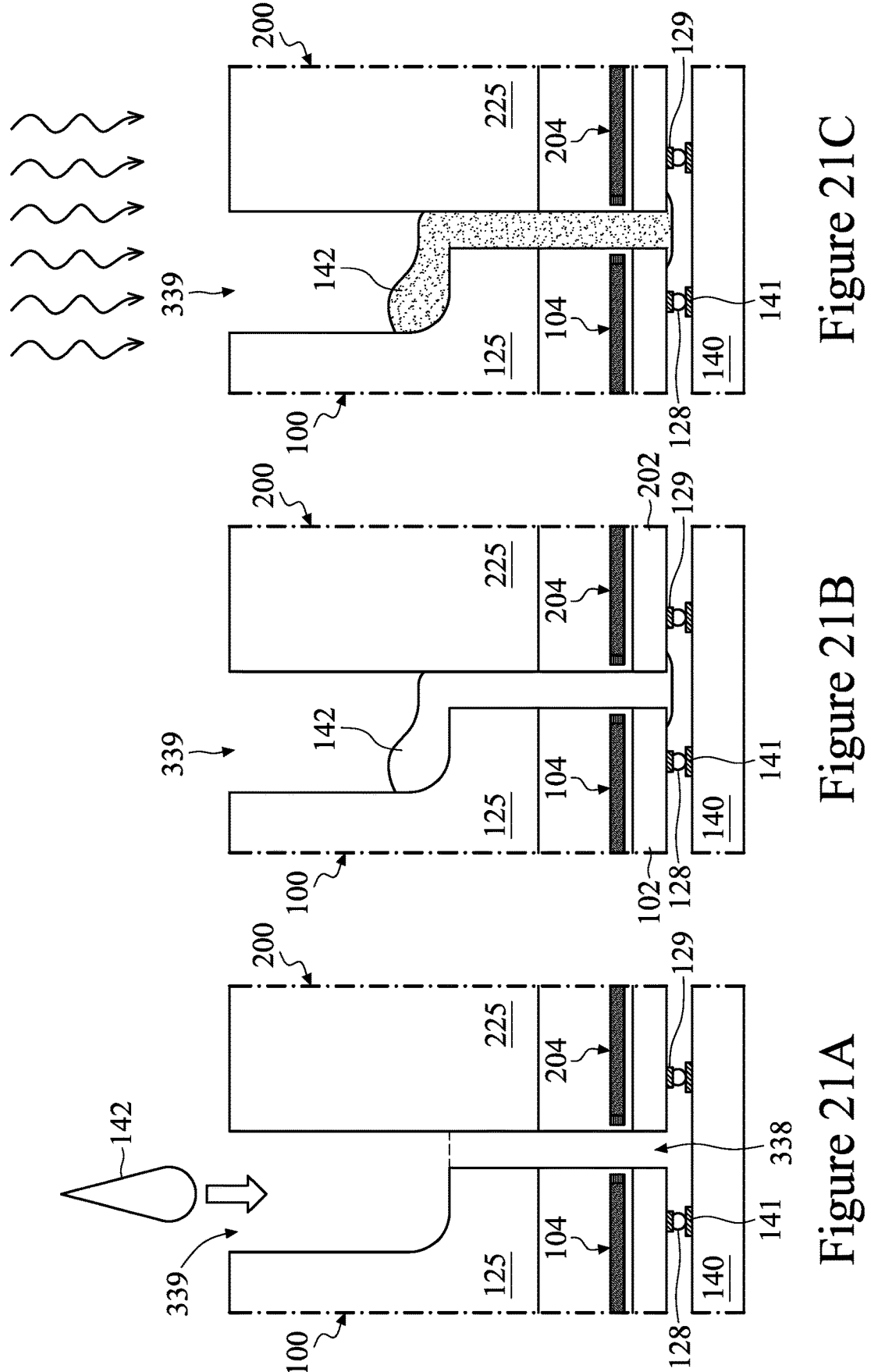
FIGS. 21A, 21B, and 21C illustrate intermediate steps in a process for depositing optical glue between photonic packages, in accordance with some embodiments.

FIGS. 21A, 21B, and 21C illustrate intermediate steps in a process for depositing optical glue between photonic packages of a photonic system, in accordance with some embodiments. The optical glue deposition process is performed to deposit an optical glue, an optical adhesive, a refractive index matching material, or the like to fill the portion of the lower gap 138 between edge couplers 107/207. For example, the optical glue may have a refractive index that is similar to that of the dielectric layers 121 and/or 221, in some cases. The presence of optical glue between the edge couplers 107/207 can facilitate optical coupling between the edge couplers 107/207 and thus allow for improved transmission of optical signals between the photonic packages 100/200. Optical glue covering sidewalls of the photonic packages 100/200 can also protect the sidewalls from damage or residue, which can help maintain efficient optical coupling. However, in some cases, optical glue deposited on top surfaces of photonic packages can present processing difficulties in subsequent steps. Additionally, in some cases, the presence of optical glue on conductive connectors (e.g., conductive connectors 128, conductive pads 129, and/or conductive pads 141) can damage or degrade the conductive connectors, risking process defects, increased resistance, or reduced device performance. Embodiments described herein allow for the deposition of optical glue between photonic packages with reduced risk of problems such as these.

In FIG. 21A, optical glue 142 is deposited into the upper gap 339 between photonic packages 100/200, in accordance with some embodiments. For example, the optical glue 142 may be deposited into or over one or more top recesses of the photonic packages 100/200. The optical glue 142 may be deposited using any suitable process, such as an ink-jet printing process or the like. By depositing the optical glue 142 into the upper gap 339, the risk of depositing optical glue 142 on a top surface of the photonic packages 100/200 is reduced.

In FIG. 21B, the optical glue 142 pools in the upper gap 339 and is drawn into the lower gap 338. The optical glue 142 may be drawn into the lower gap 338 by gravity, capillary action, or a combination thereof. In this manner, the upper gap 339 may act as a "funnel" to direct the optical glue 142 into the lower gap 338. The optical glue 142 is drawn into the lower gap 338 from the top of the lower gap 338 and at least partially fills the lower gap 338. In some embodiments, the optical glue 142 fills at least a region of the lower gap 338 that extends between the optical couplers 107/207. In some embodiments, the optical glue 142 may extend to the bottom of the lower gap 338, completely filling the lower gap 338 or almost completely filling the lower gap 338.

In some embodiments, the optical glue 142 emerges from the bottom of the lower gap 338 and extends on underside surfaces of the first photonic package 100 and/or the second photonic package 200. For example, as shown in FIG. 21B, the optical glue 142 extends over back side surfaces of the substrate 102 and the substrate 202. In some cases, the optical glue 142 may extend on a surface of a passivation layer or other layer that is the bottom-most layer of the photonic package. In some embodiments, the deposited amount of optical glue 142, the material of the optical glue 142, and/or the configuration of the upper gap 339 is controlled such that the optical glue 142 does not extend far enough underneath the photonic packages 100/200 to reach the conductive connectors 128 and/or the conductive pads 129. In this manner, problems arising from optical glue on conductive connectors or conductive pads may be avoided. In some embodiments, the optical glue 142 that emerges from the bottom of the lower gap 338 does not physically contact the interconnect substrate 140, as shown in FIGS. 21B-21C. In other embodiments, the optical glue 142 may extend or drip onto the interconnect substrate 140. By depositing the optical glue 142 into a wide upper gap 339 over the lower gap 338, the optical glue 142 may be deposited more accurately into the lower gap 338 with increased alignment tolerance of the optical glue 142 deposition process. In this manner, the width of the lower gap 338 may be smaller, which can allow for improved optical coupling between edge couplers 107/207.

In FIG. 21C, a suitable curing process is performed to cure the optical glue 142. The curing process may comprise exposing the optical glue to visible light or ultraviolet (UV) light, for example. The light, intensity thereof, wavelength (s) thereof, and/or exposure duration may depend on the material or properties of the optical glue 142. In some embodiments, the curing process may comprise a thermal process. In this manner, an optical glue 142 may be more accurately deposited between photonic packages 100/200 with reduced risk of process problems, which can allow for smaller distances between the photonic packages 100/200. This can both improve optical coupling between the photonic packages 100/200 and decrease the overall size of the photonic system 300.

Figure 22:
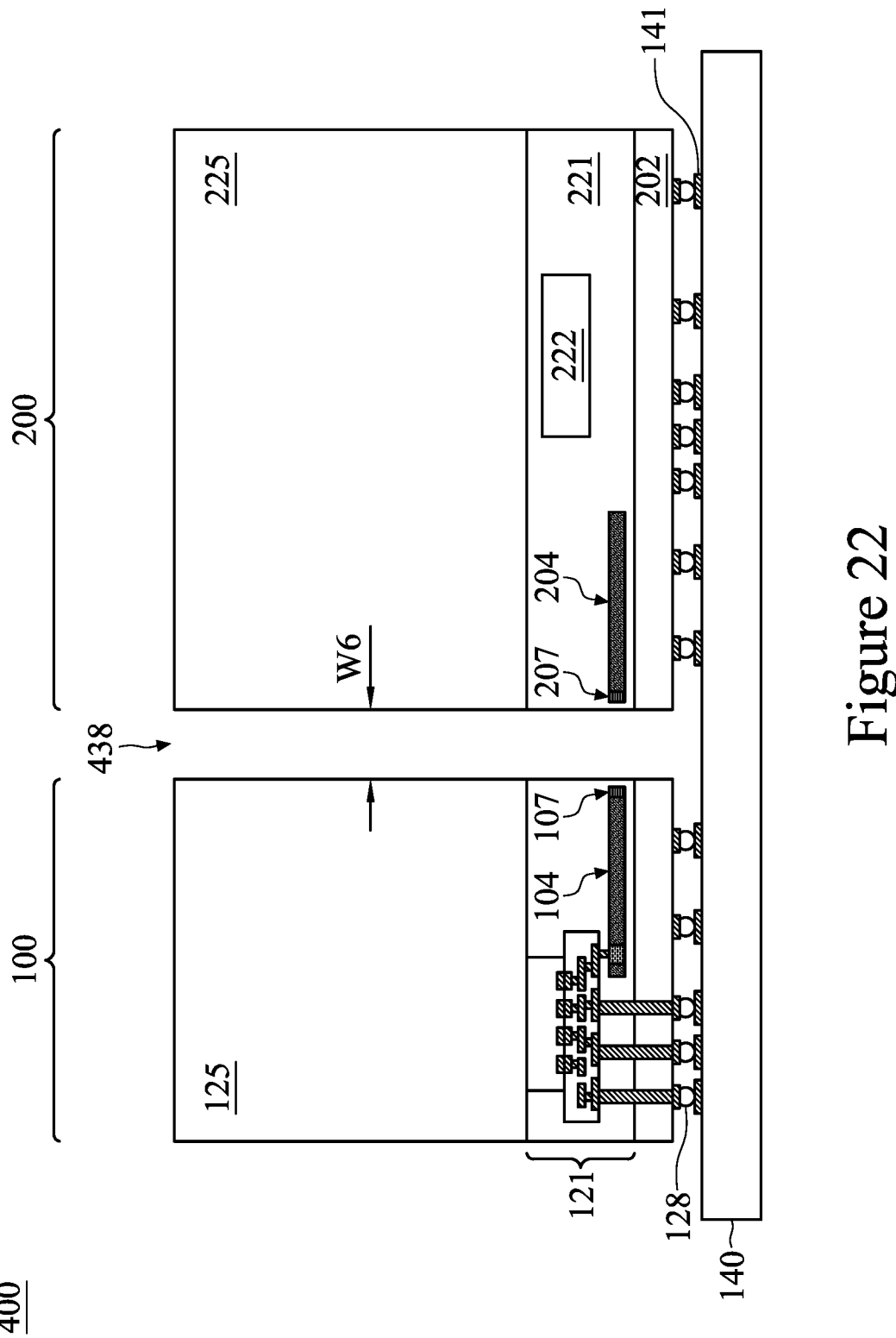
FIG. 22 illustrates a cross-sectional view of a photonic system, in accordance with some embodiments.

FIGS. 22 and 23A through 23E illustrate intermediate steps in a process for depositing optical glue between photonic packages of a photonic system, in accordance with some embodiments. FIG. 22 illustrates a photonic system 400, in accordance with some embodiments. The photonic system 400 is similar to the photonic system 300 of FIG. 19, except that the photonic packages 100/200 do not have top recesses. In the photonic system 400, the edge coupler 107 of the first photonic package 100 is optically coupled to the edge coupler 207 of the second photonic package 200. The first photonic package 100 is separated from the second photonic package 200 by a gap 438. The gap 438 may have a width W6 that is in the range of about 20 μm to about 100 μm, though other widths are possible.

Figure 23B:
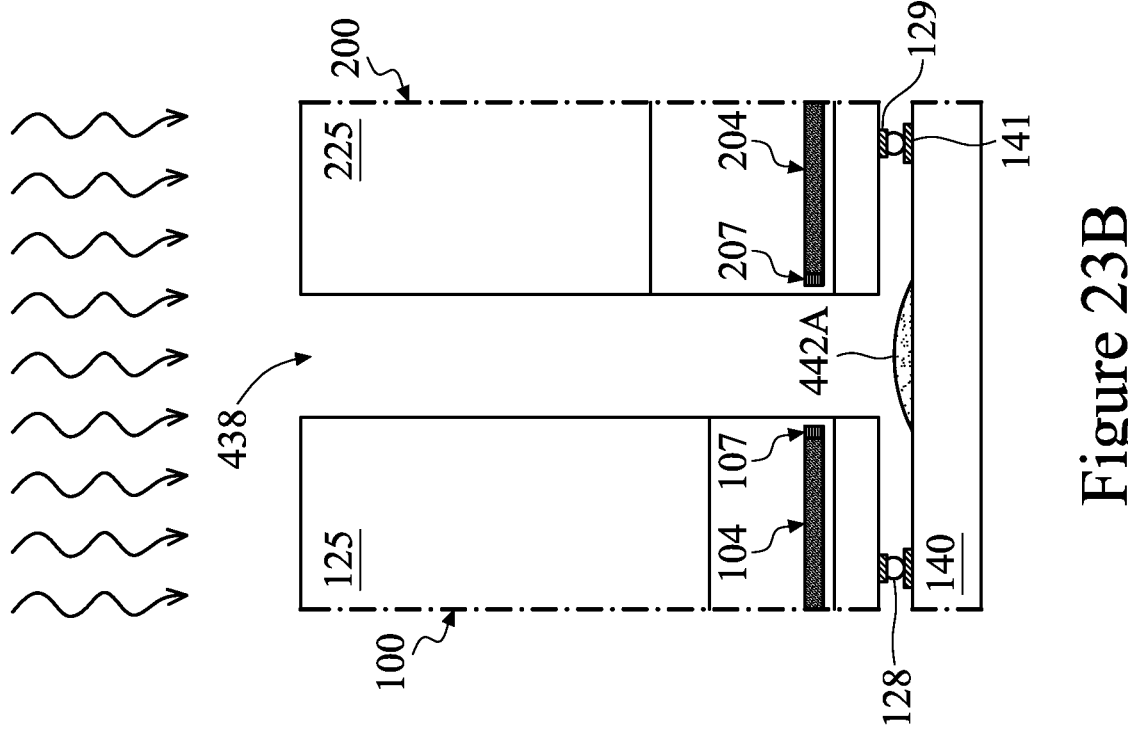
FIGS. 23A, 23B, 23C, 23D, and 23E illustrate intermediate steps in a process for depositing optical glue between photonic packages, in accordance with some embodiments.
Figure 23A:
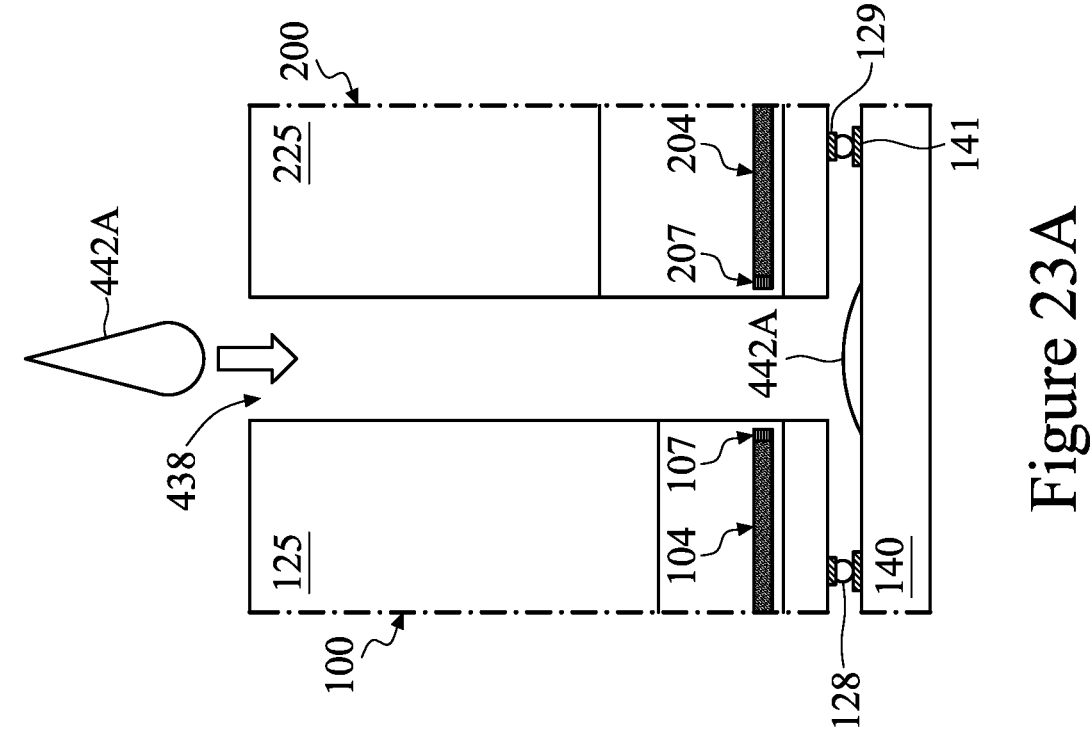

FIGS. 23A through 23E illustrate intermediate steps in the deposition of optical glue between the photonic packages 100/200 of the photonic system 400, in accordance with some embodiments. FIGS. 23A-23E show a portion of the photonic system 400. In FIG. 23A, a first amount of optical glue 442A is deposited into the gap 438. The first amount of optical glue 442A may be a similar material to the optical glue 142 described previously, and may be deposited using a suitable technique, such as an ink-jet printing process. In some cases, the first amount of optical glue 442A is a "drop" of optical glue. As shown in FIG. 23A, the first amount of optical glue 442A may be deposited on a surface of the interconnect substrate 410 underneath the gap 438. In some embodiments, no optical glue is deposited on sidewalls of the gap 438 or on top surfaces of the photonic packages 100/200.

In FIG. 23B, a curing process (e.g. a UV curing process) is performed to cure the first amount of optical glue 442A on the interconnect substrate 140 and form a first layer of optical glue 442A. The first layer of optical glue 442A may have a thickness between about 0.2 μm and about 2 μm, though other thicknesses are possible. In some embodiments, the first layer of optical glue 442A does not physically contact the conductive connectors 128, the conductive pads 129, or the conductive pads 141. In some embodiments, the first layer of optical glue 442A does not physically contact the first photonic package 100 and/or the second photonic package 200.

Figure 23D:
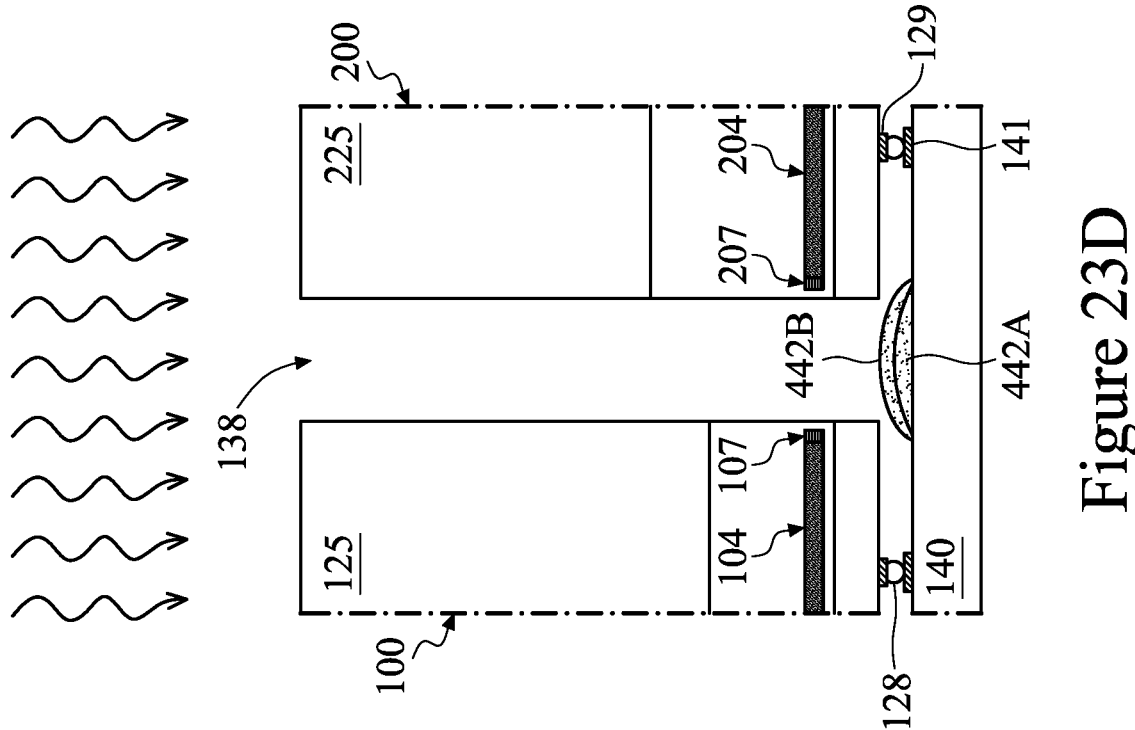
Figure 23C:
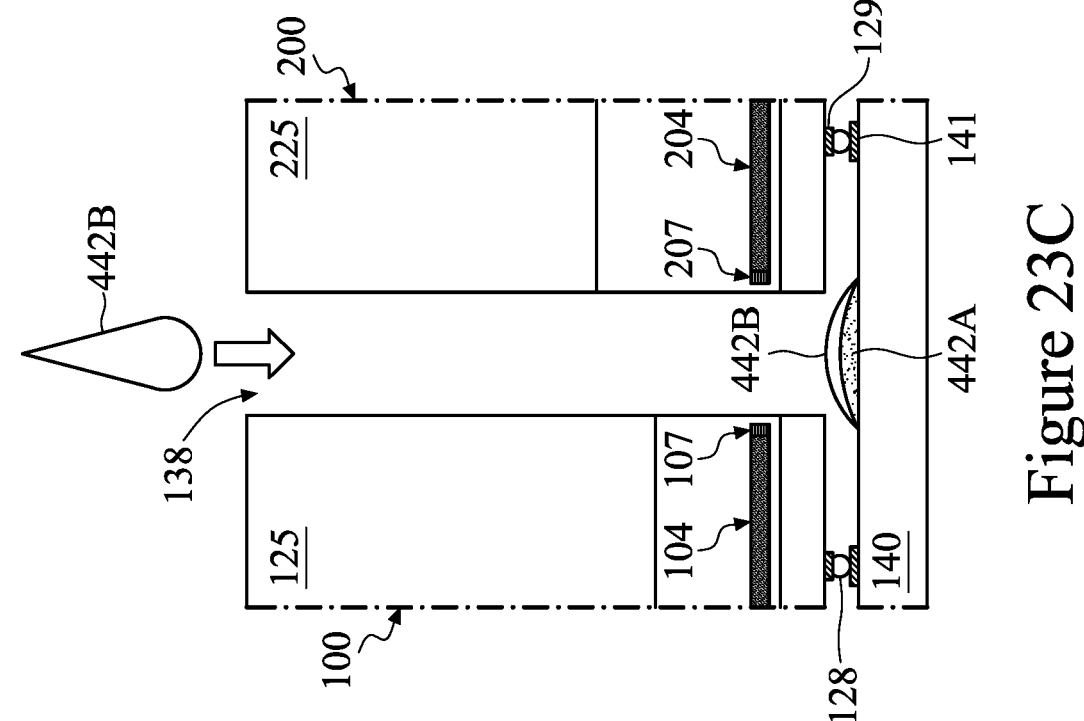

In FIG. 23C, a second amount of optical glue 442B is deposited into the gap 438 and onto the first layer of optical glue 442A. The second amount of optical glue 442A may be smaller than, about the same as, or greater than the first amount of optical glue 442B. The second amount of optical glue 442B may partially or completely cover the first layer of optical glue 442A. In FIG. 23D, a curing process is performed to cure the second amount of optical glue 442B, forming a second layer of optical glue 442B on the first layer of optical glue 442A. The second layer of optical glue 442B may have a thickness that is smaller than, about the same as, or greater than the first layer of optical glue 442A.

Figure 23E:
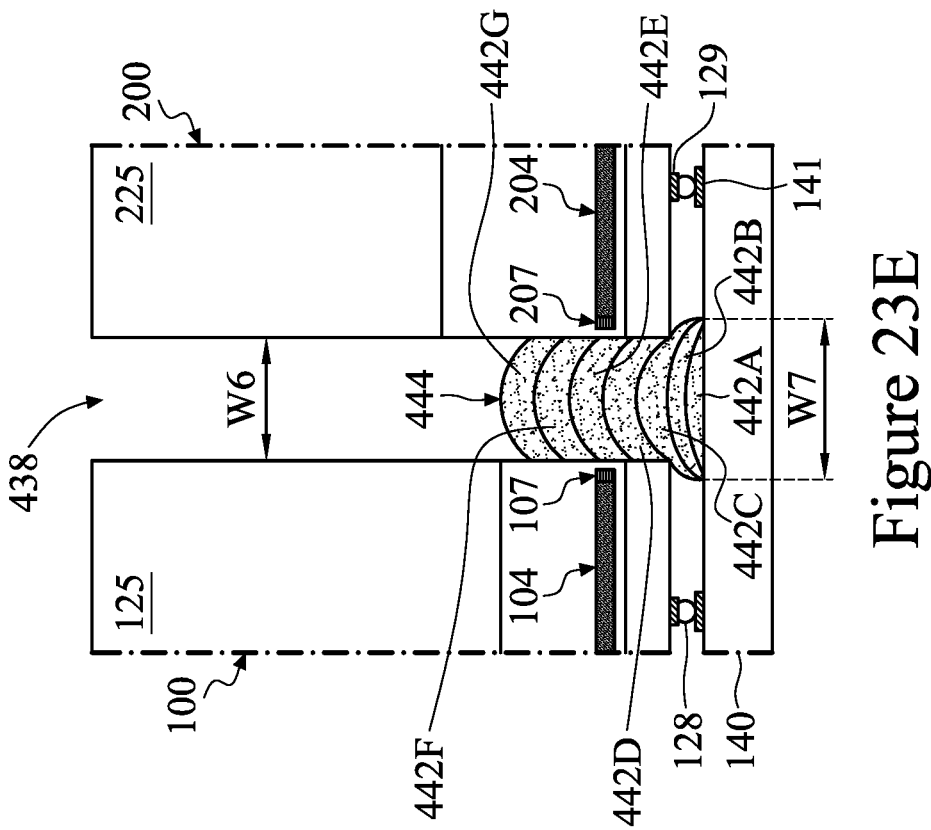

FIG. 23E illustrates the formation of additional layers of optical glue 442C-G to form a glue stack 444, in accordance with some embodiments. The additional layers of optical glue 442C-G may be formed using process similar to that described for the first layer of optical glue 442A in FIGS. 23A-B or the second layer of optical glue 442B in FIGS. 23C-D. For example a third amount of optical glue may be deposited on the second layer of optical glue 442B and cured to form a third layer of optical glue 442C. In this manner, a glue stack 444 comprising multiple layers of optical glue may be formed. The glue stack 444 in FIG. 23E includes seven layers of optical glue 442A-G, but any suitable number of layers may be formed in other embodiments. The glue stack 444 protrudes upward into the gap 438, filling at least a lower portion of it. In some embodiments, the glue stack 444 may completely fill the gap 438.

The height of the glue stack 444 may be controlled by controlling the number of layers of optical glue and/or the amount of optical glue in each layer. The glue stack 444 may be formed having a height in the range of between about 30 μm and about 60 μm, though other heights are possible. In particular, the height of the glue stack 444 may be controlled such that the glue stack 444 fills a region of the gap 438 between the edge couplers 107/207. In this manner, the glue stack 444 can provide improved optical coupling between the photonic packages 100/200, and can provide protection for the sidewalls of the photonic packages 100/200. By forming a glue stack 444 from multiple layers of optical glue as described herein, optical glue may be formed between the photonic packages 100/200 without depositing optical glue on top surfaces of the photonic packages 100/200.

As shown in FIG. 23E, a width W7 of the glue stack 444 below the gap 438 may be greater than a width W6 of the gap 438. In some embodiments, a width of the glue stack 444 below the gap 438 may be in the range of about 40 μm to about 300 μm, though other widths are possible. The width W7 may be controlled by controlling the amount of optical glue used to form at least some of the layers of optical glue. In some embodiments, the width W7 is controlled such that the glue stack 444 does not physically contact the conductive connectors 128, the conductive pads 129, or the conductive pads 141. In this manner, the glue stack 444 may be formed without problems arising from optical glue on conductive connectors or conductive pads.

Embodiments may achieve advantages. The embodiments described herein allow for a photonic system to be formed with smaller size, better yield, or improved operation. By forming a top recess in a photonic package, optical glue may be deposited into the top recess rather than on top surfaces of the photonic packages. This can reduce processing problems or additional process steps resulting from optical glue being deposited on top surfaces of the photonic packages. Additionally, the use of top recesses as described herein reduces the risk of optical glue overflow. The techniques described herein also allow for optical glue to be deposited between photonic packages while avoiding depositing optical glue on conductive connectors or conductive pads, which can reduce the chance of defects, process problems, or increased resistance. The techniques described herein can allow for reduced separation distance between photonic packages, which can improve the optical coupling between the photonic packages, which can increase device speed and efficiency. Multiple photonic packages may have top recesses, which may allow for increased tolerance to the amount or location of the optical glue deposition. Also described is the formation of an optical glue stack between photonic packages from multiple layers of optical glue, which can provide similar benefits. Using photonic packages and optical communication in this manner can provide reduced optical loss, improved efficiency, and improved high-speed communication of a photonic system.

In accordance with an embodiment of the present disclosure, a method includes connecting a first photonic package to a substrate, wherein the first photonic package includes a first waveguide and a first support over the first waveguide; connecting a second photonic package to the substrate adjacent the first photonic package, wherein the second photonic package includes a second waveguide, wherein the first photonic package and the second photonic package are laterally separated by a gap that has a width in the range of 15 μm to 190 μm; depositing a first quantity of an optical adhesive into the gap; and curing the first quantity of the optical adhesive, wherein after curing the first quantity of the optical adhesive, the first waveguide is optically coupled to the second waveguide through the first quantity of the optical adhesive. In an embodiment, wherein the first support includes a first recess in a first sidewall of the first support, wherein the first recess extends from a top surface of the first support toward a bottom surface of the first support, wherein the gap includes the first recess. In an embodiment, the first support includes a second recess in a second sidewall of the first support. In an embodiment, after curing the first quantity of the optical adhesive, a top surface of the first support is free of the optical adhesive. In an embodiment, connecting the first photonic package to the substrate includes attaching the first photonic package to conductive pads of the substrate using solder bumps, wherein the solder bumps and the conductive pads are free of the optical adhesive. In an embodiment, the second photonic package includes a second support over the second waveguide, wherein the second support includes a third recess in a third sidewall of the second support, wherein the gap includes the third recess. In an embodiment, the first quantity of optical adhesive is deposited onto a previously-deposited second quantity of the optical adhesive. In an embodiment, after curing the first quantity of the optical adhesive, the optical adhesive extends on a bottom surface of the first photonic package. In an embodiment, the first waveguide is optically coupled to the second waveguide by an edge coupler.

In accordance with an embodiment of the present disclosure, a method includes forming photonic packages on a substrate, wherein each photonic package includes a waveguide, wherein adjacent photonic packages are separated by a respective scribe region; attaching a support structure to a top side of the photonic packages; performing an etching process on a bottom side of the photonic packages to form first recesses, wherein the first recesses extend partially into the support structure, wherein the first recesses have a first width; and performing a first sawing process on a top side of the support structure to form second recesses, wherein each second recess exposes a respective first recess, wherein each second recess has a second width that is greater than the first width. In an embodiment, the etching process includes a plasma dicing process. In an embodiment, the first sawing process singulates each photonic package. In an embodiment, the method includes performing a second sawing process in each second recess to form respective third recesses, wherein each third recess has a third width that is smaller than the second width. In an embodiment, the method includes attaching one photonic package to an interconnect substrate and depositing optical glue into the second recess. In an embodiment, the optical glue covers a sidewall of the one photonic package that is adjacent the waveguide.

In accordance with an embodiment of the present disclosure, a system includes a first photonic package attached to an interconnect structure, wherein the first photonic package includes a first waveguide adjacent a first sidewall of the first photonic package; a second photonic package attached to the interconnect structure, wherein the second photonic package includes a second waveguide adjacent a second sidewall of the second photonic package, wherein the second sidewall faces the first sidewall; and a glue stack on a top surface the interconnect structure, wherein the glue stack includes layers of cured optical glue, wherein the glue stack extends from the first sidewall to the second sidewall, wherein the first waveguide is optically coupled to the second waveguide through the glue stack. In an embodiment, a height of the glue stack above the interconnect structure is greater than a height of the first waveguide above the interconnect structure. In an embodiment, the second photonic package includes a laser diode that is optically coupled to the second waveguide. In an embodiment, a width of the glue stack on the top surface of the interconnect structure is greater than a width between the first sidewall and the second sidewall. In an embodiment, the first photonic package is attached to the interconnect structure by solder bumps, wherein each solder bump is separated from the glue stack.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
    connecting a first photonic package to a substrate, wherein the first photonic package comprises a first waveguide and a first support over the first waveguide, wherein connecting the first photonic package to the substrate comprises attaching the first photonic package to conductive features of the substrate using solder bumps;
    connecting a second photonic package to the substrate adjacent the first photonic package, wherein the second photonic package comprises a second waveguide, wherein the first photonic package and the second photonic package are laterally separated by a gap that has a width in the range of 15 μm to 190 μm;
    depositing a first quantity of an optical adhesive into the gap; and
    curing the first quantity of the optical adhesive, wherein after curing the first quantity of the optical adhesive, the first waveguide is optically coupled to the second waveguide through the first quantity of the optical adhesive, wherein the solder bumps and the conductive features are free of the optical adhesive.

2. The method of claim 1, wherein the first support comprises a first recess in a first sidewall of the first support, wherein the first recess extends from a top surface of the first support toward a bottom surface of the first support, wherein the gap comprises the first recess.

3. The method of claim 2, wherein the first support comprises a second recess in a second sidewall of the first support.

4. The method of claim 1, wherein after curing the first quantity of the optical adhesive, a top surface of the first support is free of the optical adhesive.

5. The method of claim 1, wherein the second photonic package comprises a second support over the second waveguide, wherein the second support comprises a third recess in a third sidewall of the second support, wherein the gap comprises the third recess.

6. The method of claim 1, wherein the first quantity of optical adhesive is deposited onto a previously-deposited second quantity of the optical adhesive.

7. The method of claim 1, wherein, after curing the first quantity of the optical adhesive, the optical adhesive extends on a bottom surface of the first photonic package.

8. The method of claim 1, wherein the first waveguide is optically coupled to the second waveguide by an edge coupler.

9. A system, comprising:

a first photonic package attached to an interconnect structure, wherein the first photonic package comprises a first waveguide adjacent a first sidewall of the first photonic package;

a second photonic package attached to the interconnect structure, wherein the second photonic package comprises a second waveguide adjacent a second sidewall of the second photonic package, wherein the second sidewall faces the first sidewall; and a glue stack on a top surface of the interconnect structure, wherein the glue stack comprises a plurality of layers of cured optical glue, wherein the glue stack extends from the first sidewall to the second sidewall, wherein the first waveguide is optically coupled to the second waveguide through the glue stack.

10. The system of claim 9, wherein a height of the glue stack above the interconnect structure is greater than a height of the first waveguide above the interconnect structure.

11. The system of claim 9, wherein the second photonic package comprises a laser diode that is optically coupled to the second waveguide.

12. The system of claim 9, wherein a width of the glue stack on the top surface of the interconnect structure is greater than a width between the first sidewall and the second sidewall.

13. The system of claim 9, wherein the first photonic package is attached to the interconnect structure by a plurality of solder bumps, wherein each solder bump is separated from the glue stack.

14. A method comprising:

attaching a first photonic package to a substrate, wherein the first photonic package comprises a first edge coupler;

attaching a second photonic package to the substrate, wherein the second photonic package comprises a second edge coupler, wherein the first photonic package is separated from the second photonic package by a gap;

depositing a first amount of optical glue into the gap;

performing a first curing process on the first amount of optical glue to form a first optical glue layer on the substrate;

depositing a second amount of optical glue into the gap; and performing a second curing process on the second amount of optical glue to form a second optical glue layer in the gap over the first optical glue layer, wherein the first edge coupler is optically coupled to the second edge coupler through the second optical glue layer.

15. The method of claim 14, wherein the first curing process is a UV curing process.

16. The method of claim 14, wherein the second optical glue layer extends from a sidewall of the first photonic package to a sidewall of the second photonic package.

17. The method of claim 14 further comprising forming a plurality of optical glue layers between the first optical glue layer and the second optical glue layer.

18. The method of claim 14, wherein the first photonic package comprises a first support and the second photonic package comprises a second support, wherein a width between a sidewall of the first support and a sidewall of the second support is greater than a width of the gap.

19. The method of claim 14, wherein the first photonic package is attached to the substrate by conductive connectors, wherein the conductive connectors are free of the first optical glue layer.

20. The method of claim 1, wherein the first quantity of the optical adhesive is separated from the substrate.

* * * * *